(12) United States Patent
Kobayashi et al.

(10) Patent No.: US 7,664,824 B2
(45) Date of Patent: Feb. 16, 2010

(54) SYSTEM FOR TRANSMISSION/RECEPTION OF E-MAIL WITH ATTACHED FILES

(75) Inventors: Susumu Kobayashi, Kyoutanabe (JP); Takeshi Ohmura, Kanzaki (JP); Masanori Nakanishi, Osaka (JP); Tetsuji Sumita, Hiroshima (JP); Eiji Ueda, Toyota (JP)

(73) Assignee: Panasonic Corporation, Osaka (JP)

( * ) Notice: Subject to any disclaimer, the term of this patent is extended or adjusted under 35 U.S.C. 154(b) by 971 days.

(21) Appl. No.: 09/910,853

(22) Filed: Jul. 24, 2001

(65) Prior Publication Data
US 2002/0010748 A1 Jan. 24, 2002

(30) Foreign Application Priority Data
Jul. 24, 2000 (JP) .............................. 2000-223058

(51) Int. Cl.
G06F 15/16 (2006.01)
(52) U.S. Cl. .................. 709/217; 709/203; 709/201
(58) Field of Classification Search ................. 709/206, 709/201, 217; 713/193; 707/204
See application file for complete search history.

(56) References Cited

U.S. PATENT DOCUMENTS

| | | | | |
|---|---|---|---|---|
| 5,418,908 A * | 5/1995 | Keller et al. | ................. | 709/206 |
| 5,781,901 A * | 7/1998 | Kuzma | ..................... | 707/10 |
| 5,903,723 A * | 5/1999 | Beck et al. | .................. | 709/200 |
| 5,913,032 A | 6/1999 | Schwartz et al. | | |
| 6,073,133 A * | 6/2000 | Chrabaszcz | ................ | 707/10 |
| 6,256,666 B1 * | 7/2001 | Singhal | ..................... | 709/217 |
| 6,345,288 B1 * | 2/2002 | Reed et al. | .................. | 709/201 |
| 6,360,252 B1 * | 3/2002 | Rudy et al. | .................. | 709/206 |
| 6,438,585 B2 * | 8/2002 | Mousseau et al. | ........... | 709/206 |
| 6,463,463 B1 * | 10/2002 | Godfrey et al. | ............. | 709/206 |
| 6,505,236 B1 * | 1/2003 | Pollack | ....................... | 709/206 |
| 6,505,237 B2 * | 1/2003 | Beyda et al. | ................. | 709/206 |
| 6,628,306 B1 * | 9/2003 | Marchionda | ................ | 715/752 |
| 6,651,087 B1 * | 11/2003 | Dennis | ....................... | 709/206 |
| 6,785,867 B2 * | 8/2004 | Shaffer et al. | ............... | 715/203 |
| 6,834,312 B2 * | 12/2004 | Edwards et al. | ............. | 709/246 |
| 6,836,891 B2 * | 12/2004 | Okada et al. | ................. | 719/313 |
| 6,839,411 B1 * | 1/2005 | Saltanov et al. | .......... | 379/88.13 |
| 6,859,213 B1 * | 2/2005 | Carter | ........................ | 715/752 |
| 6,865,191 B1 * | 3/2005 | Bengtsson et al. | .......... | 370/475 |
| 6,898,622 B1 * | 5/2005 | Malik | ......................... | 709/206 |
| 7,032,000 B2 * | 4/2006 | Tripp | ......................... | 709/202 |

(Continued)

FOREIGN PATENT DOCUMENTS

EP 0 950 969 10/1999

(Continued)

*Primary Examiner*—Larry D Donaghue
*Assistant Examiner*—Karen C Tang
(74) *Attorney, Agent, or Firm*—Wenderoth, Lind & Ponack, L.L.P.

(57) ABSTRACT

A mail gateway generates an identifier for each attached file included in the e-mail addressed to a user and held in a mail server, and notifies a mail terminal belonging to the user of a list of generated IDs. When the user selects attached files that the user wants to attach to the e-mail from the list of IDs that is notified from the mail gateway, the mail gateway constructs e-mail including the selected attached files and the mail server transmits the constructed e-mail to addresses of the receivers of the e-mail.

30 Claims, 24 Drawing Sheets

U.S. PATENT DOCUMENTS

| | | | |
|---|---|---|---|
| 7,054,905 B1 * | 5/2006 | Hanna et al. | 709/206 |
| 7,124,305 B2 * | 10/2006 | Margolus et al. | 713/193 |
| 7,149,777 B1 * | 12/2006 | Rhee | 709/206 |
| 2002/0019851 A1 * | 2/2002 | Pollack | 709/206 |
| 2002/0049853 A1 * | 4/2002 | Chu et al. | 709/237 |
| 2005/0108335 A1 * | 5/2005 | Naick et al. | 709/206 |
| 2007/0143431 A1 * | 6/2007 | Prahlad et al. | 709/206 |
| 2008/0014917 A1 * | 1/2008 | Rhoads et al. | 455/422.1 |

FOREIGN PATENT DOCUMENTS

| | | |
|---|---|---|
| EP | 0 974 917 | 1/2000 |
| JP | 11-175419 A | 7/1999 |
| KR | 1999-0083930 | 12/1999 |

* cited by examiner

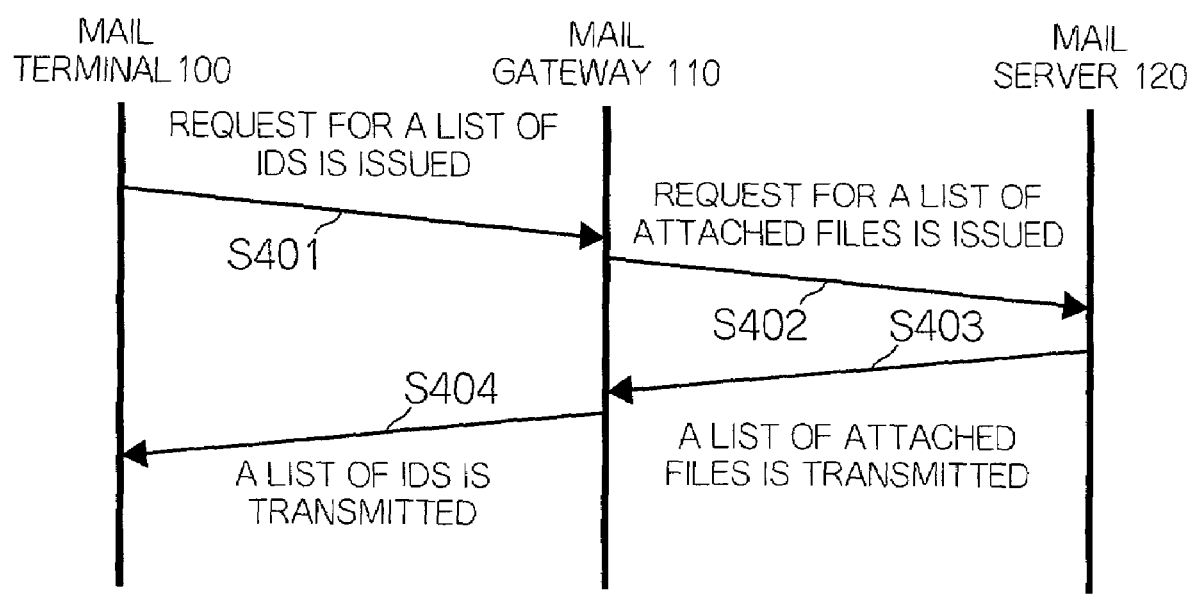

| RECEIVER'S ADDRESS | FILE FORMAT OF ATTACHED FILE THAT RECEIVER SHOULD ADOPT |
|---|---|
| user1@aaa.aaa.aa | doc, bmp, jpg |
| user2@bbb.bbb.bb | txt, bmp |
| user3@ccc.ccc.cc | doc, gif |
| user4@ddd.ddd.dd | txt, jpg |
| user5@eee.eee.ee | doc, txt, bmp, jpg |

FIG.17A (1700)

| From : user1@aaa.aaa.aa<br>To : user2@bbb.bbb.bb<br>Subject : THIS IS DATA! |
|---|
| MESSAGE 1502<br>(MAIN BODY) |
| ATTACHED FILE<br>(shiryou1.txt) |
| ATTACHED FILE<br>(shiryou2.bmp) |

FIG.17B (1701)

| From : user1@aaa.aaa.aa<br>To : user3@ccc.ccc.cc<br>Subject : THIS IS DATA! |
|---|
| MESSAGE 1502<br>(MAIN BODY) |
| ATTACHED FILE<br>(shiryou1.doc) |
| ATTACHED FILE<br>(shiryou2.gif) |

FIG.17C (1702)

| From : user1@aaa.aaa.aa<br>To : user4@ddd.ddd.dd<br>Subject : THIS IS DATA! |
|---|
| MESSAGE 1502<br>(MAIN BODY) |
| ATTACHED FILE<br>(shiryou1.txt) |
| ATTACHED FILE<br>(shiryou2.jpg) |

| SHARED ID | ATTACHED ID | SHARER |
|---|---|---|
| ZXFG743211 | GYF93501:001 | user24, user6, user109 |
| TYJI94890F | A23BG968:003 | user9 |
| A8745HDW30 | C67J9DF7:005 | user53, user65, user9, user21 |
| KRS73209L4 | RD90K574:002 | user5, user9 |
| JJD5409M82 | XUH7J6F1:004 | user10, user11, user12 |

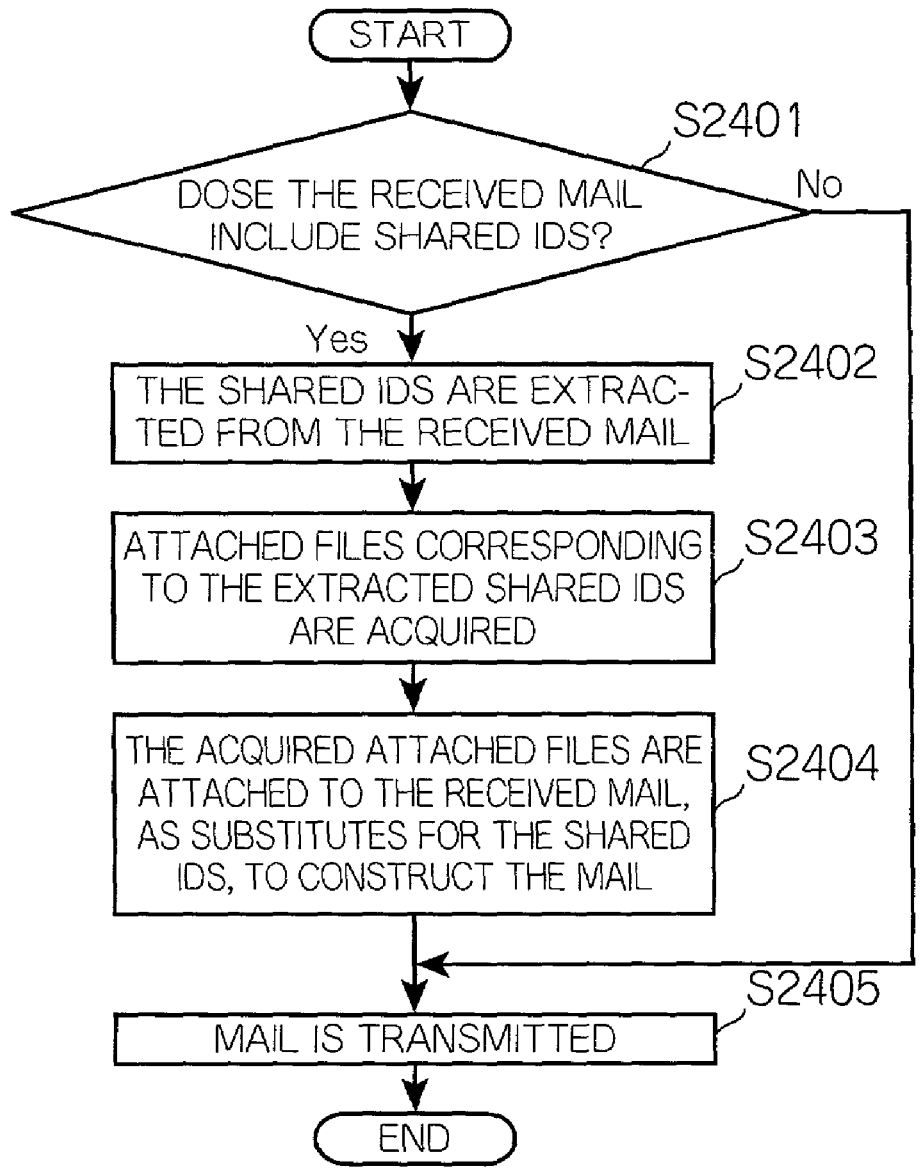

SYSTEM FOR TRANSMISSION/RECEPTION OF E-MAIL WITH ATTACHED FILES

BACKGROUND OF THE INVENTION (1) Field of the Invention

The present invention relates to an e-mail transmission/reception system. More specifically, the present invention relates to a system for the transmission/reception of e-mail with attached files.

(2) Description of the Related Art

The Internet is basically available through terminals provided at offices and homes. Recently, however, new usage patterns of the Internet such as "mobile computing" and "mobile Internet" are becoming common. In the mobile computing, the Internet is accessed by cellular phones and Personal Handyphone Systems (PHS) connected to personal computers or Personal Digital Assistants (PDA). The mobile Internet (e.g., Internet service for cellular phones) refers to a usage pattern that combines mobile machines, which are free from restrictions on time and space, and the Internet, which contains information from all over the world. As the mobile computing and the mobile Internet become widespread, we become able to easily send and receive e-mail at anytime and anyplace. However, when sending e-mail with attached files to cellular phones and PHSs, the attached files are automatically deleted in most of the mobile Internet services.

Meanwhile, there are some mobile Internet services for storing attached files in the server and forwarding them to another receiver's address. For instance, a service named "MOZIO e-mail" provided by ASTEL group including TOKYO TELECOMMUNICATION NETWORK CO., INC, stores an attached file included in the received e-mail in a mail server, and adds a message of "The mail includes an attached file" to the e-mail from which the attached file has been removed so as to inform a subscriber of the existence of the attached file. Then, if the subscriber forwards the e-mail with such a message from the PHS to another address that is available from a personal computer or the like, the mail server attaches the stored file to the e-mail and sends the e-mail to the other address. Thus, the subscriber can receive the e-mail with the attached file by means of the personal computer.

In addition, a similar technology is disclosed in the Japanese Laid-Open Patent Application No. 11-175419. This application discloses an e-mail transmission/reception system in which, when forwarding an e-mail with an attached file from a mail terminal to another receiver's address, there is no necessity to transmit the attached file from the mail terminal to a mail server.

This e-mail transmission/reception system is composed of a mail terminal which is equipped with Mail User Agent (MUA), a mail gateway that relays e-mail between the mail terminal and a mail server, and the mail server which is equipped with Mail Transport Agent (MTA).

Here, the MUA is a program for providing a user interface to read and write e-mail, and the MTA is a program for delivering e-mail.

When receiving an acquisition request for the e-mail, which is received by the mail server, from the mail terminal, the mail gateway acquires the e-mail from the mail server, separates an attached file from the e-mail, stores the separated file having a mail ID, and manages the file. When receiving e-mail (consisting of the main body and a mail ID for identifying the original mail) that should be forwarded to another address from the mail terminal, the mail gateway attaches the stored and managed attached file to the e-mail on the basis of the mail ID for identifying the original mail and sends the e-mail consisting of the main body and the attached file to the mail server.

In this way, the above-mentioned system enables the mail terminal to send e-mail with an attached file to a forwarding address only by sending e-mail having a mail ID for identifying the original mail to the mail gateway.

However, according to the above-mentioned conventional system, when a plurality of attached files are included in the mail, there is a problem in that a file to be attached cannot be selected from the plurality of attached files but all files included in the e-mail are unconditionally attached to the e-mail, because mail IDs are used for linking e-mail and attached files. That is, in the conventional system, it is impossible to send e-mail including an attached file that a user selects from among a plurality of attached files without attaching the attached file by the mail terminal. The same goes for the above-mentioned service "MOZIO e-mail."

SUMMARY OF THE INVENTION

To cope with the above-mentioned problem, the object of the present invention is to provide an e-mail transmission/reception system, a mail gateway, a mail terminal, a program recording medium, and a program by which, when using attached files that are included in the received e-mail (e.g., forwarding of e-mail), a user can select attached files that the user wants to attach to the e-mail from among a plurality of attached files that are included in the received plural pieces of e-mail, and the e-mail including the selected attached files can be transmitted to the receivers' addresses of the e-mail, without attaching the selected attached files to the e-mail by the mail terminal.

An e-mail transmission/reception system according to the invention includes a mail terminal, a mail server, and a mail gateway, wherein the mail gateway is connected to the mail terminal via a network and the mail server via another network. The mail server includes: an attached file holding unit operable to receive e-mail addressed to a user who possesses the mail terminal and hold one or more attached files that are included in the e-mail; and a mail distribution unit operable to receive e-mail transmitted from the mail gateway and distribute the e-mail to one or more receivers' addresses thereof. The mail gateway includes: an identifier generation unit operable to generate an identifier for each attached file held by the attached file holding unit; a list transmission unit operable to generate a list of identifiers generated by the identifier generation unit and transmit the list to the mail terminal; a reception unit operable to receive e-mail transmitted from the mail terminal, where the e-mail includes one or more identifiers that the user selects from the identifier list as substitutes for one or more attached files that the user wants to attach to the e-mail; an attached file acquisition unit operable to acquire attached files from the attached file holding unit, where the attached files correspond to the identifiers included in the e-mail received by the reception unit; a construction unit operable to construct e-mail by attaching the attached files acquired by the attached file acquisition unit to the e-mail received by the reception unit; and a mail transmission unit operable to transmit the e-mail constructed by the construction unit to the mail server. The mail terminal includes: a list reception unit operable to receive the identifier list from the mail gateway; a preparation unit operable to prepare e-mail that includes one or more identifiers selected by the user from the identifier list as substitutes for one or more attached files that the user wants to attach to the e-mail; and a transmission unit operable to transmit the prepared e-mail to the mail gateway (hereafter called system A).

With this construction, the e-mail transmission/reception system of the present invention associates an attached ID with each of the attached files that are included in the received e-mail when using the attached files. Thereby, when attached file(s) to be forwarded is/are prepared in the mail terminal, the attached file that the user wants to attach to the e-mail can be selected by the attached ID, without attaching the attached files to the e-mail, so that the e-mail including the selected attached file can be transmitted to the receivers' addresses. In addition, new e-mail including attached files can be prepared by using the attached files that are included in the e-mail that has been received and stored in the system. Further, the data size of the e-mail with attached IDs that are associated with attached files is smaller than the data size of the e-mail with attached files, so that a load applied to the line between the mail terminal and the mail gateway can be reduced. Therefore even in the case of cellular phones whose transmission speed is low, attached files can be practicably (i.e., in a short time period and at a low cost) transmitted to the receivers' addresses.

Also, the mail terminal can prepare e-mail including attached IDs that have a one to one correspondence to each of the attached files that are included in the received e-mail and can transmit the prepared e-mail to the receivers' addresses.

In addition, in the above e-mail transmission/reception system A, the attached file holding unit, whenever receiving e-mail that includes attached files, generates a list of the attached files and passes the list to the identifier generation unit, and the identifier generation unit generates an identifier for each of the attached files in accordance with the list passed by the attached file holding unit.

With this construction, in addition to the above-stated effects, the mail server of the e-mail transmission/reception system of the present invention, when receiving e-mail, notifies the mail gateway of the list of attached IDs that are associated with the attached files addressed to the user of the mail terminal, so that there is no need for the user to perform a procedure for acquiring the list of attached IDs.

In addiction, in the above e-mail transmission/reception system A, the mail terminal further includes a file format registration unit operable to register one or more files formats of attached files for each receiver's address that the receiver should adopt in the mail gateway. The mail gateway further includes: a file format storage unit operable to store receivers' addresses and file formats that are registered by the file format registration unit; and a file format conversion unit operable to convert file formats of attached files for each receiver's address in accordance with the receivers' addresses and the file formats that are stored in the file format storage unit. Furthermore, the construction unit constructs e-mail by attaching the attached files converted by the file format conversion unit from and as a substitute for the attached files acquired by the attached file acquisition unit.

With this construction, in addition to the above-stated effects, the e-mail transmission/reception system of the present invention can convert attached files for each receiver's address to construct e-mail, and can transmit e-mail suitable for the receiver's address.

In addition, in the above e-mail transmission/reception system A, the mail terminal further includes a sharing notification unit operable to notify the mail gateway that one or more attached files included in e-mail addressed to the user of the mail terminal are to be shared with other users. The mail gateway further includes: an attached file sharing unit operable to, when receiving the notification that the attached files are to be shared with the other users from the mail terminal, share each of the attached files held by the attached file holding unit with the other users; a shared identifier generation unit operable to generate a shared identifier for each of the attached files shared by the attached file sharing unit, wherein the shared identifier is available for sharers of the attached files. The sharing notification unit further includes: a shared file notification unit operable to notify the mail gateway of one or more identifiers selected by the user from the identifier list as substitutes for the one or more attached files that are permitted to be shared; and a sharer notification unit operable to notify the mail gateway of one or more sharers (shared users) of each of the attached files that are to be shared with the other users. The attached file sharing unit shares attached files that correspond to the identifiers notified from the shared file notification unit from among attached files held by the attached file holding unit with the sharers notified from the sharer notification unit. The list transmission unit further transmits a list of the shared identifiers to the sharers of the attached files. The attached file acquisition unit further acquires attached files that correspond to the shared identifiers. The list reception unit further receives a list of shared identifiers that have a one to one correspondence to each of the attached files that are shared by the user of the mail terminal as one member of the sharers.

With this construction, in addition to the above-stated effects, attached files included in the e-mail addressed to the other users can be used among sharers of the attached files. Therefore, attached files provided from the other users also can be attached to the e-mail to be transmitted.

A mail gateway according to the present invention is connected to a mail terminal via a network and a mail server via another network. The mail server receives e-mail addressed to a user of the mail terminal and holds one or more attached files included in the received e-mail. The mail gateway device includes: an identifier generation unit operable to generate an identifier for each attached file held by the attached file holding unit; a list transmission unit operable to generate a list of identifiers generated by the identifier generation unit and transmit the list to the mail terminal; a reception unit operable to receive e-mail transmitted from the mail terminal, where the e-mail includes one or more identifiers selected by the user from the identifier list as substitutes for one or more attached files that the user wants to attach to the e-mail; an attached file acquisition unit operable to acquire attached files from the mail server, where the attached files correspond to the identifiers included in the e-mail received by the reception unit; a construction unit operable to construct e-mail by attaching the attached files acquired by the attached file acquisition unit to the e-mail received by the reception unit; and a mail transmission unit operable to transmit the e-mail constructed by the construction unit to the mail server.

With this construction, the mail gateway of the present invention associates an attached ID with each of the attached files included in the received e-mail. Thereby, when using the attached files, the attached file that the user wants to attach to the e-mail can be selected by the attached ID without attaching the attached files to the e-mail, so that the e-mail including the attached file corresponding the attached ID can be constructed and transmitted to the receivers' addresses.

A mail terminal according to the present invention is connected to a mail gateway via a network, and the mail gateway generates an identifier for each of attached files included in e-mail addressed to a user of the mail terminal and manages the generated identifier. The mail terminal includes: a list reception unit operable to receive a list of identifiers from the mail gateway; a preparation unit operable to prepare e-mail that includes one or more identifiers selected by the user from the identifier list as substitutes for one or more attached files that the user wants to attach to the e-mail; and a transmission unit operable to transmit the e-mail prepared by the preparation unit to the mail gateway.

With this construction, when using attached files included in the received e-mail, the mail terminal of the present invention prepares e-mail including attached IDs. Thereby, the e-mail to which the attached files corresponding to the attached IDs are attached can be transmitted to the receivers' addresses of the e-mail.

According to the present invention, a method for controlling an e-mail transmission/reception system including a mail terminal, a mail server, and a mail gateway is provided, where the mail gateway is connected to the mail terminal via a network and the mail server via another network. The method includes the following steps: an attached file holding step of receiving e-mail addressed to a user who possesses the mail terminal and holding one or more attached files included in the e-mail in the mail server; an identifier generation step of the mail gateway generating an identifier for each attached file held in the attached file holding step; a list transmission step of generating a list of identifiers generated in the identifier generation step and transmitting the list from the mail gateway to the mail terminal; a list reception step of receiving the identifier list from the mail gateway by the mail terminal; a preparation step of the mail terminal preparing e-mail that includes one or more identifiers selected by the user from the identifier list as substitutes for one or more attached files that the user wants to attach to the e-mail; a transmission step of transmitting the e-mail prepared in the preparation step to the mail gateway; a reception step of receiving e-mail transmitted from the mail terminal by the mail gateway, where the e-mail includes one or more identifiers that the user selects from the identifier list as substitutes for one or more attached files that the user wants to attach to the e-mail; an attached file acquisition step of acquiring attached files from the mail server by the mail gateway, where the attached files correspond to the identifiers included in the e-mail received in the reception step; a construction step of the mail gateway constructing e-mail by attaching the attached files acquired in the attached file acquisition step to the e-mail received in the reception step; a mail transmission step of transmitting the e-mail constructed in the construction step from the mail gateway to the mail server; and a mail distribution step of receiving the e-mail transmitted from the mail gateway terminal by the mail server and distributing the e-mail from the mail server to receivers' addresses of the e-mail.

With this construction, the method for controlling the e-mail transmission/reception system of the present invention associates an attached ID with each of the attached files that are included in the received e-mail when using the attached files. Thereby, when attached files to be forwarded are prepared in the mail terminal, the attached file that the user wants to attach to the e-mail can be selected by the attached ID, without attaching the attached files to the e-mail, so that the e-mail including the selected attached file can be transmitted to the receivers' addresses. In addition, new e-mail including attached files can be prepared by using the attached files included in the e-mail that has been received and stored in the system. Further, the data size of the e-mail with attached IDs that are associated with attached files is smaller than the data size of the e-mail with attached files, so that a load applied to the line between the mail terminal and the mail gateway can be reduced. Therefore, even in the case of cellular phones whose transmission speed is low, attached files can be practicably (i.e., in a short time period and at a low cost) transmitted to the receivers' addresses.

Also, the mail terminal can prepare e-mail including attached IDs that have a one to one correspondence to each of the attached files that are included in the received e-mail and can transmit the prepared e-mail to the receivers' addresses.

According to the present invention, a recording medium is provided which is readable for a computer connected to a mail terminal via a network and a mail server via another network, where the mail server receives e-mail addressed to a user of the mail terminal and holds one or more attached files that are included in the received e-mail. A computer program embodied on the recording medium has the computer conduct the following steps: an identifier generation step of generating an identifier for each attached file held by the mail server; a list transmission step of generating a list of identifiers generated in the identifier generation step and transmitting the list to the mail terminal; a reception step of receiving e-mail transmitted from the mail terminal, where the e-mail includes one or more identifiers selected by the user from the identifier list as substitutes for one or more attached files that the user wants to attach to the e-mail; an attached file acquisition step of acquiring attached files from the mail server, where the attached files correspond to the identifiers included in the e-mail received in the reception step; a construction step of constructing e-mail by attaching the attached files acquired in the attached file acquisition step to the e-mail received in the reception step; and a mail transmission step of transmitting the e-mail constructed in the construction step to the mail server.

With this construction, when the computer readable recording medium which records a program for mediating between the mail terminal and the mail server executes the program on general hardware such as computers, the hardware associates an attached ID with each of the attached files included in the received e-mail. Thereby, e-mail can be constructed so as to include attached files corresponding to the attached IDs without attaching attached files to be forwarded to the e-mail transmitted from the mail terminal and can be transmitted to receivers' addresses.

According to the present invention, a recording medium is provided which is readable for a computer (i.e., a computer-readable medium) that is connected to a mail gateway via a network, where the mail gateway generates an identifier for each of the attached files that are included in e-mail addressed to a user of a mail terminal and manages the generated identifier. A computer program embodied on the recording medium has the computer conduct the following steps: a list reception step of receiving a list of identifiers from the mail gateway; a preparation step of preparing e-mail that includes one or more identifiers selected by the user from the identifier list as substitutes for one or more attached files that the user wants to attach to the e-mail; and a transmission step of transmitting the e-mail prepared in the preparation step to the mail gateway.

With this construction, when the computer readable recording medium according to the present invention that records a program equipped with a user interface for writing/reading e-mail executes the program on general hardware such as computers, the hardware prepares e-mail including attached IDs as substitutes for attached files, so that e-mail with attached files corresponding to the attached IDs can be transmitted to the receivers' addresses.

According to the present invention, a program is provided which is embodied on a computer connected to a mail terminal via a network and a mail server via another network, where the mail server receives e-mail addressed to a user of the mail terminal and holds one or more attached files that are included in the received e-mail. The program has the computer conduct the following steps: an identifier generation step of generating an identifier for each attached file held by the mail server; a list transmission step of generating a list of identifiers generated in the identifier generation step and transmitting the list to the mail terminal; a reception step of receiving e-mail transmitted from the mail terminal, where the e-mail includes one or more identifiers selected by the user from the identifier list as substitutes for one or more attached files that the user wants to attach to the e-mail; an attached file acquisition step of acquiring attached files from the mail server, where the attached files correspond to the identifiers included in the e-mail received in the reception step; a construction step of constructing e-mail by attaching the attached files acquired in the attached file acquisition step to the e-mail received in the reception step; and a mail transmission step of transmitting the e-mail constructed in the construction step to the mail server.

With this construction, when the program for mediating between the mail terminal and the mail server is executed on general hardware such as computers, the hardware associates an attached ID with each of the attached files included in the received e-mail. Thereby, e-mail can be constructed so as to include attached files corresponding to the attached IDs without attaching attached files to be forwarded to the e-mail transmitted from the mail terminal and can be transmitted to receivers' addresses.

According to the present invention, a program is provided which is embodied on a computer that is connected to a mail gateway via a network, where the mail gateway generates an identifier for each of attached files that are included in e-mail addressed to a user of a mail terminal and manages the generated identifier. The program has the computer conduct the following steps: a list reception step of receiving a list of identifiers from the mail gateway; a preparation step of preparing e-mail that includes one or more identifiers selected by the user from the identifier list as substitutes for one or more attached files that the user wants to attach to the e-mail; and a transmission step of transmitting the e-mail prepared in the preparation step to the mail gateway.

With this construction, when the program equipped with a user interface for writing/reading the e-mail is executed on general hardware such as computers, the hardware prepares e-mail including attached IDs as substitutes for attached files, so that e-mail with attached files corresponding to the attached IDs can be transmitted to the receivers' addresses.

BRIEF DESCRIPTION OF THE DRAWINGS

These and other objects, advantages and features of the present invention will become more apparent from the following detailed description when taken in conjunction with the accompanying drawings which illustrate a specific embodiments of the present invention.

In the drawings:

FIG. 4 shows a sequence for acquiring an attached ID corresponding to each of the attached files included in the received mail;

FIGS. 17A, 17B, and 17C show a data structure of the mail constructed for each of the receivers' addresses;

FIG. 22 is a correspondence table consisting of "shared IDs", "attached IDs", and "sharers", in which the table is stored in the ID storing unit;

FIG. 24 is a flowchart showing a procedure for the mail gateway to construct the mail including the shared ID sent from the mail terminal.

DETAILED DESCRIPTION OF THE PREFERRED EMBODIMENT

The following describes an encrypted communication system 5 according to a preferred embodiment of the present invention.

First Embodiment

Figure 1:
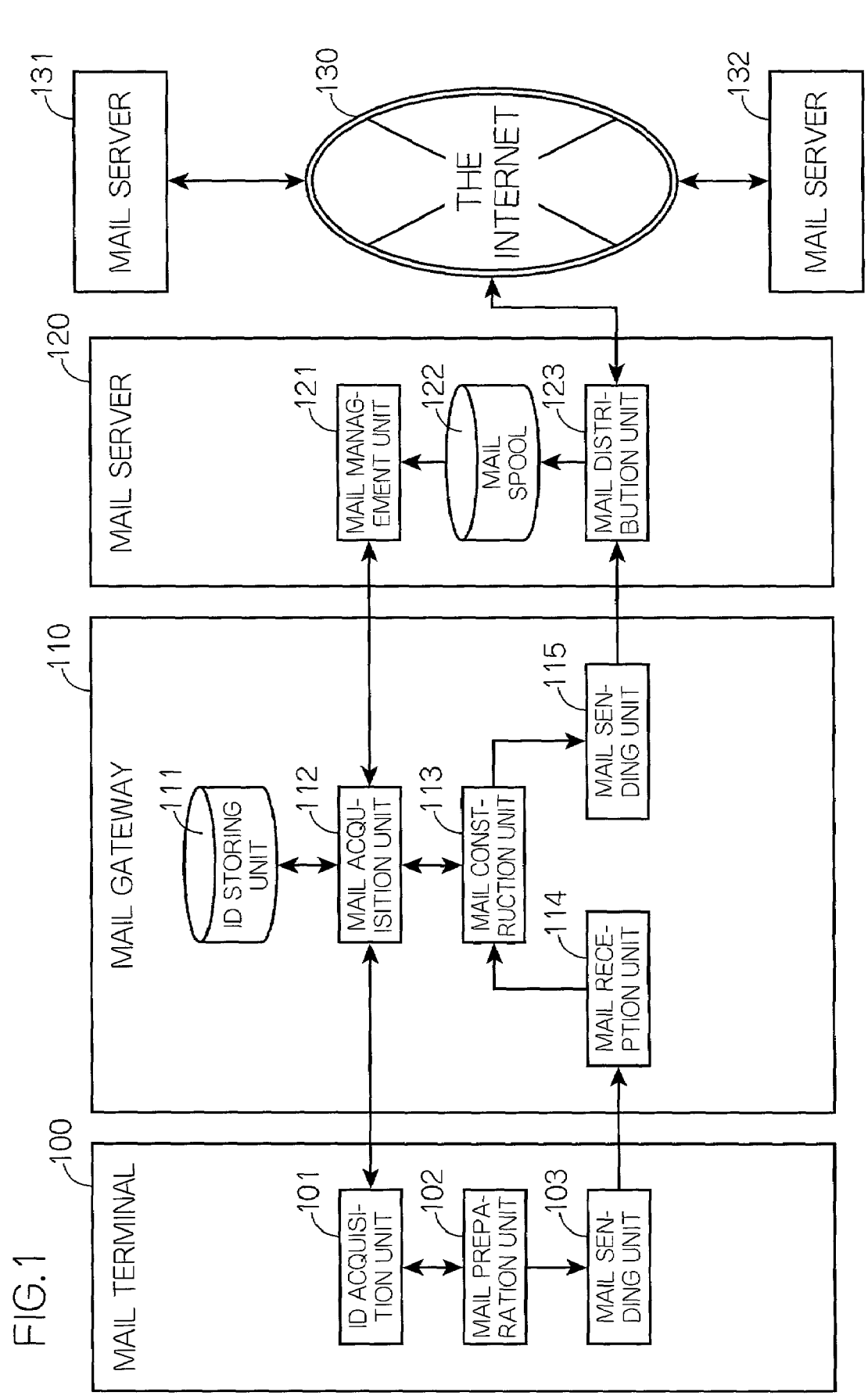
FIG. 1 is a block diagram showing the construction of the e-mail transmission/reception system including a mail terminal, a mail gateway, and a mail server.

FIG. 1 is a block diagram showing the construction of the e-mail transmission/reception system according to the first embodiment of the present invention including a mail terminal 100, a mail gateway 110, and a mail server 120.

[Construction of the Mail Terminal 100]

As shown in FIG. 1, the mail terminal 100 consists of an ID acquisition unit 101, a mail preparation unit 102, and a mail sending unit 103.

The ID acquisition unit 101 issues an ID acquisition request to the mail gateway 110 to acquire a list of attached IDs from the mail gateway 110. The acquired list is passed to the mail preparation unit 102.

Here, the attached ID refers to an identifier that is generated for and corresponds to each of the attached files included in the mail (hereafter referred to as "received mail") that the mail server 120 receives and stores for each user.

The mail preparation unit 102 prepares the mail that should be sent (hereafter referred to as "transmit mail" so as to be distinguished from the received mail) and passes the transmit mail to the mail sending unit 103. In this embodiment, instead of an attached file included in the received mail, an attached ID is included that specifies the attached file in accordance with a list of the attached IDs that is passed from the ID acquisition unit 101.

The mail sending unit 103 receives the transmit mail prepared by the mail preparation unit 102 and sends the transmit mail to the mail gateway 110.

Here, the mail terminal 100 according to this embodiment is a mobile information terminal which is equipped with Mail User Agent (MUA). The MUA is a program for providing a user interface to read and write e-mail.

[Construction of the Mail Gateway 110]

The mail gateway 110 consists of an ID storing unit 111, a mail acquisition unit 112, a mail construction unit 113, a mail reception unit 114, and a mail sending unit 115.

The ID storing unit 111 stores attached IDs for each user. Here, the attached IDs are associated with the attached files by the mail acquisition unit 112.

The mail acquisition unit 112 issues a request for the acquisition of a list of attached files to the mail server 120 in response to the ID acquisition request from the mail terminal 100 to acquire the list from the mail server 120, and the mail acquisition unit 112 associates each attached file with an attached ID in accordance with the list. Then, the mail acquisition unit 112 stores the associated attached IDs in the ID storing unit 111 and sends the attached IDs to the mail terminal 100. Also, the mail acquisition unit 112, in response to a request for the acquisition of an attached file from the mail construction unit 113 and in accordance with correspondences between attached files and attached IDs that is stored in the ID storing unit 111, issues a request for the acquisition of the attached file corresponding to the attached ID to the mail server 120 to acquire the attached file from the mail server 120, and passes the acquired attached file to the mail construction unit 113.

The mail construction unit 113 receives the transmitted mail that has been passed from the mail reception unit 114, and analyzes the received mail. As a result of the analysis, in a case where the received mail does not include attached IDs, then the mail construction unit 113 passes the mail without being processed to the mail sending unit 115. Alternatively, in a case where the received mail includes attached IDs, then the mail construction unit 113 extracts the attached IDs, and issues a request for the acquisition of the attached files corresponding to the extracted attached IDs to the mail acquisition unit 112 so as to receive the attached file from the mail acquisition unit 112. Then, the mail construction unit 113 attaches the received attached file, instead of the attached ID, to the transmitted mail that has been passed from the mail reception unit 114 to construct a transmit mail, and passes the constructed transmit mail (hereafter called "constructed mail" so as to be distinguished from the other mail) to the mail sending unit 115.

The mail reception unit 114 receives the transmit mail transmitted from the mail terminal 100 and passes the received transmit mail to the mail construction unit 113.

The mail sending unit 115 receives a transmit mail or a constructed mail that has been passed from the mail construction unit 113 and sends transmit or constructed mail to the mail server 120.

[Construction of the Mail Server 120]

The mail server 120 consists of a mail management unit 121, a mail spool 122, and a mail distribution unit 123.

The mail management unit 121 manages the received mail. When receiving a request for the acquisition of a received mail or an attached file from the mail gateway 110, the mail management unit 121 acquires the received mail or the attached file from the mail spool 122, and sends the acquired mail or attached file to the mail gateway 110. In addition, when receiving a request for the acquisition of a list of received mail or a list of attached files, the mail management unit 121 acquires the list from the mail spool 122 and sends the acquired list to the mail gateway 110.

The mail distribution unit 123 receives mail (received mail) transmitted through Internet 130 or mail (transmit mail or constructed mail) transmitted from the mail gateway 110, keeps e-mail addressed to users whose addresses are managed by the mail server 120 in the mail spool 122, and distributes e-mail addressed to the other users whose addresses are not managed by the mail server 120 to such addresses.

Here, the mail server 120 in this embodiment is a computer which is equipped with Mail Transport Agent (MTA). The MTA is a program for delivering e-mail.

[Structure of Received Mail with an Attached File]

Figure 2:
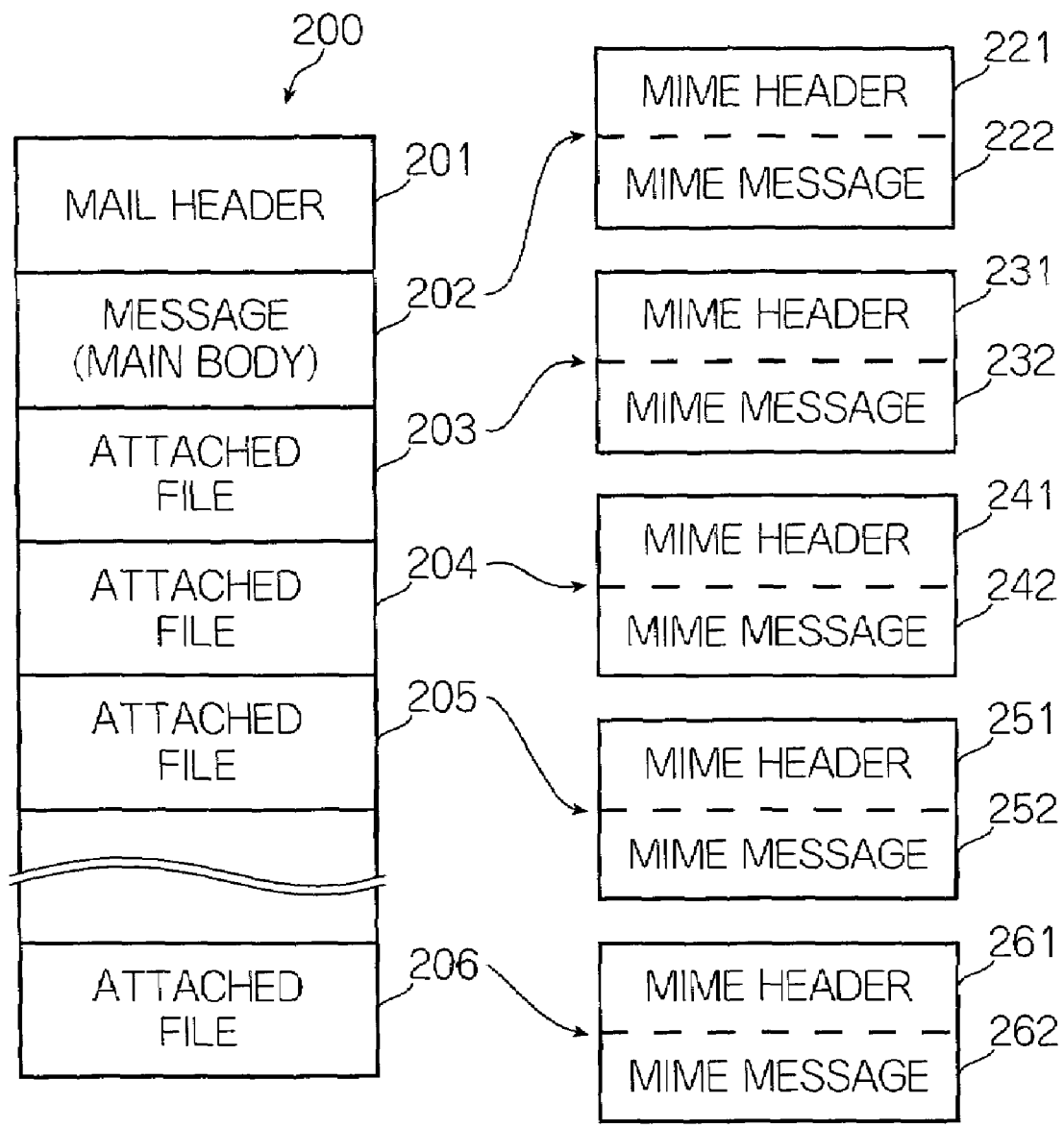
FIG. 2 shows a data structure of received e-mail with an attached file that the mail server receives.

FIG. 2 shows a data structure of received mail with an attached file that the mail server 120 receives.

Here, the received mail 200 in this embodiment is described in a form of Multipurpose Internet Mail Extensions (MIME).

As shown in FIG. 2, the received mail 200 with the attached file consists of a mail header 201, a message 202, and attached files 203 through 206.

Information for controlling the mail is described in the mail header 201, and the information includes a sender, receivers' addresses, a subject matter, a receiving date, a sending date, a message ID, and the like.

Here, the message ID is a character string that is generated for each piece of e-mail that the mail server 120 receives. For instance, in the e-mail described in a form of Request For Comment (RFC) 822, the message ID is the character string described in the "Message-ID" field.

The message 202 consists of a MIME header 221 and a MIME message 222. Here, the mail header 201 and the message 202 are divided from each other by a blank line.

The attached files 203 through 206 are files that are attached to the e-mail and they include document data, image data, sound data, and so on. Each attached file consists of a MIME header and a MIME message.

Here, the MIME header includes information on a name of the contents, a format of the contents (e.g., document, image, sound, their file formats and the like), and an encode format (base64 or the like). The MIME message includes the text data in a case where the attached file includes text data, and includes the text data that has been converted by means of base 64 or the like in a case where the attached file includes binary data (e.g., image, sound, or the like). Here, the MIME header and the MIME message are divided from each other by a blank line, and attached files are divided from one another by the boundary designating character string that is described in the mail header 201.

[Operations]

The following describes the operation of the above-mentioned e-mail transmission/reception system, taking the transmission of the received mail 200 as an example. Hereafter, the mail that is prepared when forwarding the received mail 200 will be called "forwarded mail" so as to be distinguished from the other mails.

Figure 3:
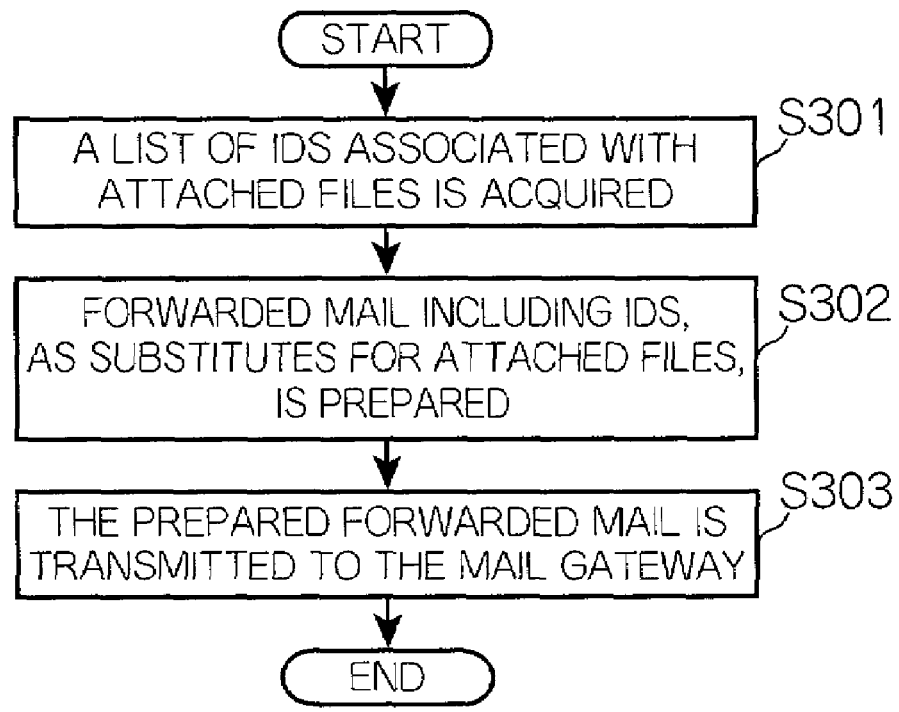
FIG. 3 is a flowchart showing a procedure for forwarding the received mail by the mail terminal.

FIG. 3 is a flowchart showing a procedure for forwarding the received mail 200 by the mail terminal 100.

As shown in FIG. 3, when forwarding the received mail 200, the ID acquisition unit 101 in the mail terminal 100 first acquires, from the mail gateway 110, a list of attached IDs that has a one to one correspondence to attached files which are included in the received mail 200 (Step S301).

FIG. 4 shows a sequence for acquiring an attached ID corresponding to each attached file included in the received mail 200.

As shown in FIG. 4, the mail terminal 100 issues an ID acquisition request to the mail gateway 110 (S401). The mail gateway 110 that receives the ID acquisition request issues a request for the acquisition of a list of attached files to the mail server 120 (S402). The mail server 120 that receives the request for the acquisition of a list of attached files acquires a list of attached files which are included in the received mail from the mail spool 122 and sends the list to the mail gateway 110 (S403). The mail gateway 110 that receives the list associates each of the attached files with an attached ID in accordance with the list and sends the list of the attached IDs to the mail terminal 100 (S404).

Figure 5A:
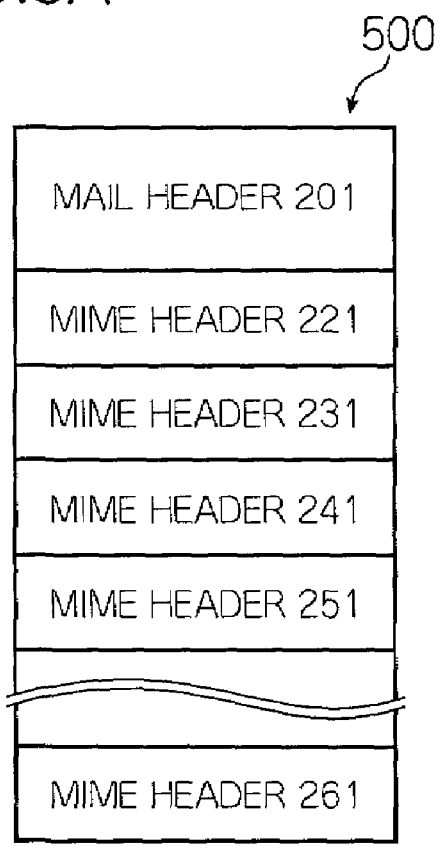
FIG. 5A shows a structure of a list of attached files.
Figure 5B:
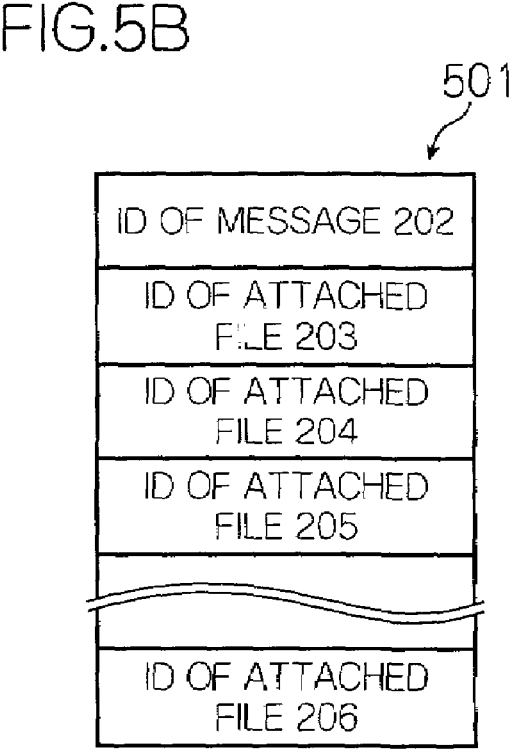
FIG. 5B shows a structure of a list of IDs.

FIG. 5A shows a data structure of the list of attached files that is transmitted in the above step S403 (a list 500 of attached files prepared from the received mail 200), and FIG. 5B shows a data structure of the list of IDs that is transmitted in the above step S404 (a list 501 of IDs prepared from the list 500).

As shown in FIG. 5A, the list 500 of attached files consists of a mail header 201 and MIME headers 221 through 261 of the received mail 200.

The list 501 of IDs consists of an attached ID of a message 202 and attached IDs of attached files from 203 to 206. Here, the attached ID is made from a message ID that is described in the mail header 201 included in the attached file 500 and the order of each of the MIME headers 221 through 226 when counting the order from the top of the list (attached order of the attached files).

Figure 6:
FIG. 6 is a correspondence table between attached files and attached IDs in a case where the message ID of the received mail is set at "0123456789"

FIG. 6 is a correspondence table between attached files and attached IDs in a case where the message ID of the received mail 200 is set at "0123456789".

According to FIG. 6, an attached ID corresponding to the attached file 203 that is firstly attached in the received mail 200 is "0123456789:001", and an attached ID corresponding to the attached file 204 that is secondly attached is "0123456789:002". Hereafter, a format of attached IDs corresponding to attached files is set at the form of "message ID: attached order of the attached file", and the attached ID of the message 202 is set at "0123456789:000".

These attached IDs are stored in the ID storing unit 111, and they are passed from the mail acquisition unit 111 in the mail gateway 110 to the mail terminal 100. Then, the ID acquisition unit 101 in the mail terminal 100 acquires a list of attached IDs that is transmitted from the mail gateway 110.

Here, the mail terminal 100 in this embodiment is equipped with MUA by which acquired attached IDs can be browsed to select the attached ID corresponding to the attached file that should be attached.

Now, referring back to FIG. 3, the mail preparation unit 102 in the mail terminal 100 prepares forwarded mail including the attached ID that the ID acquisition unit 101 acquires as a substitute for the attached file that is included in the received mail 200 (Step S302).

Figure 7:
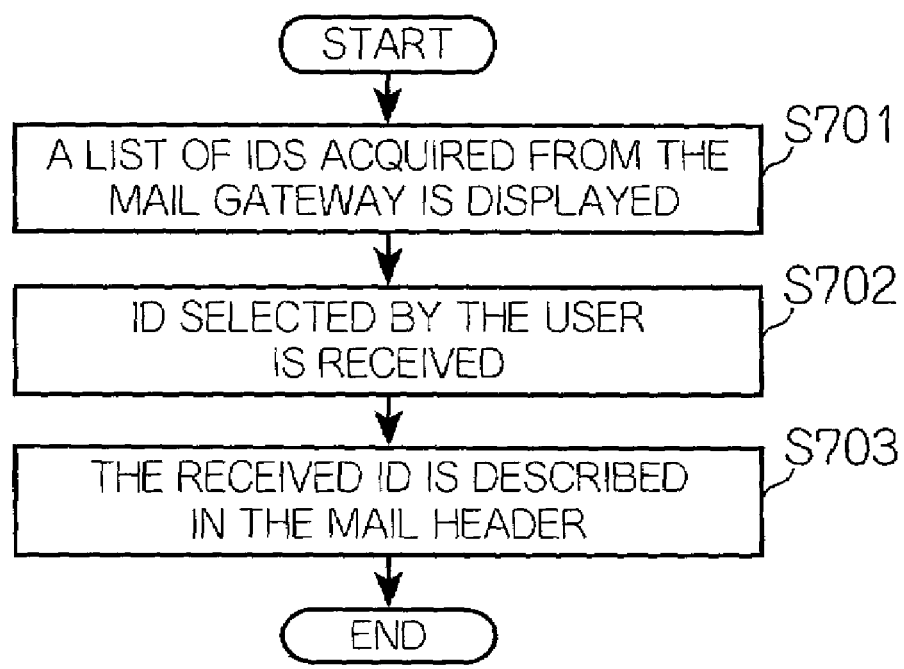
FIG. 7 is a flowchart showing a procedure for describing an attached ID that the ID acquisition unit acquires in the forwarded mail made from the received mail.

FIG. 7 is a flowchart showing a procedure for describing attached IDs that the ID acquisition unit 101 acquires in the forwarded mail that is made from the received mail 200.

As shown in FIG. 7, the mail terminal 100 first displays a list of attached IDs which is acquired from the mail gateway 110 (Step S701). Next, the mail terminal 100 receives the attached ID that is selected by a user having the mail terminal 100 (Step S702). Then, the mail terminal 100 describes the received attached ID in the mail header of the forwarded mail (Step S703).

Figure 8:
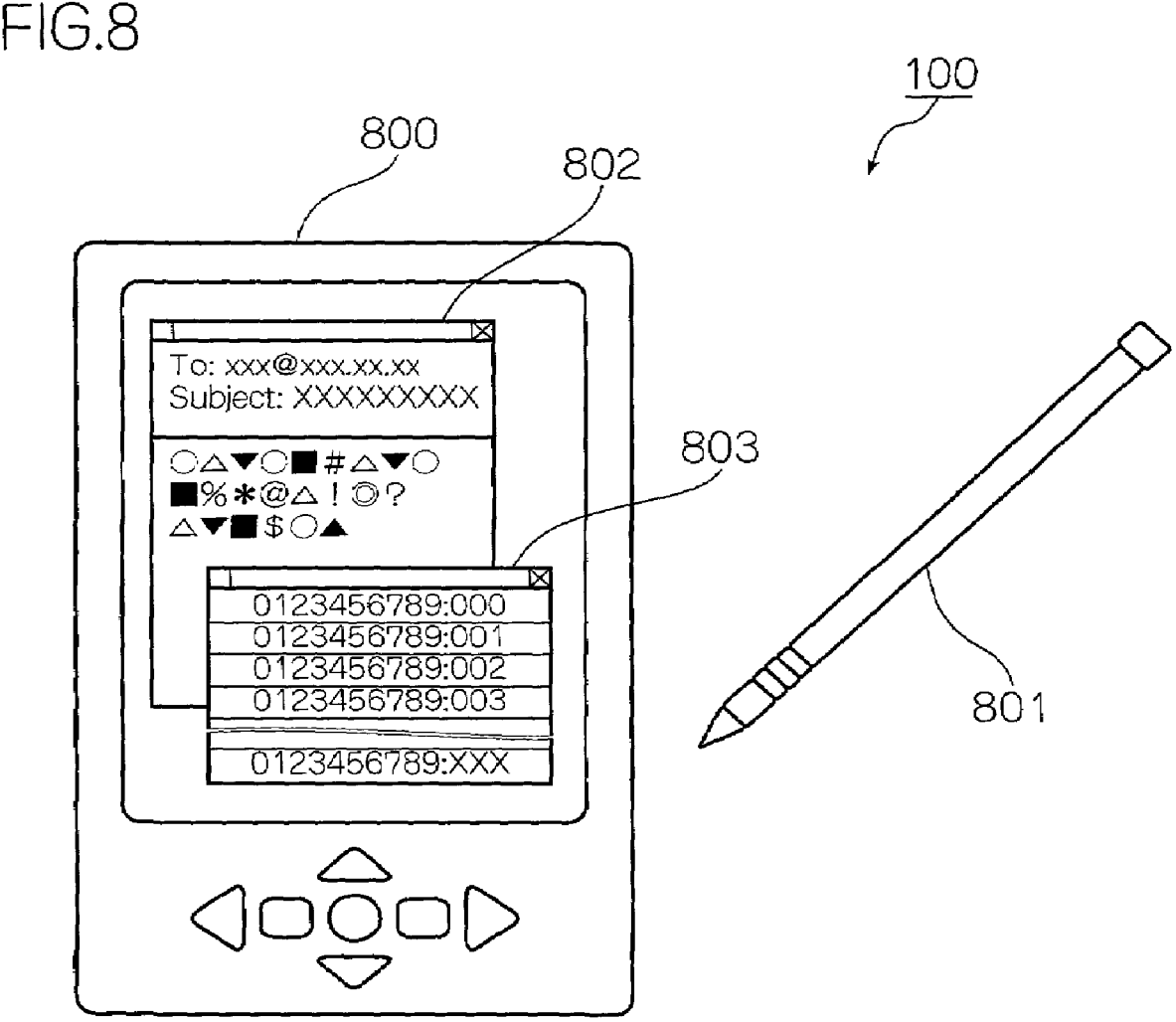
FIG. 8 shows a state where the mail preparation unit prepares the forwarded mail from the received mail.

FIG. 8 shows a state where the mail preparation unit 102 prepares the forwarded mail made from the received mail.

As shown in FIG. 8, the mail terminal 100 consists of a terminal 800 and a pen 801.

The display unit in the terminal 800 displays forwarded mail 802 made from the received mail 200 and a list 803 of attached IDs having a one to one correspondence to attached files that are included in the received mail 200. The list 803 is a list of attached IDs that the ID acquisition unit 101 acquires. The user having the mail terminal 100 selects the attached ID corresponding to the attached file that the user wants to attach to the forwarded mail 802 from the list 803 by touch-inputting with the pen 801. Then, the selected attached file is described in the mail header in the forwarded mail 802.

Figure 9:
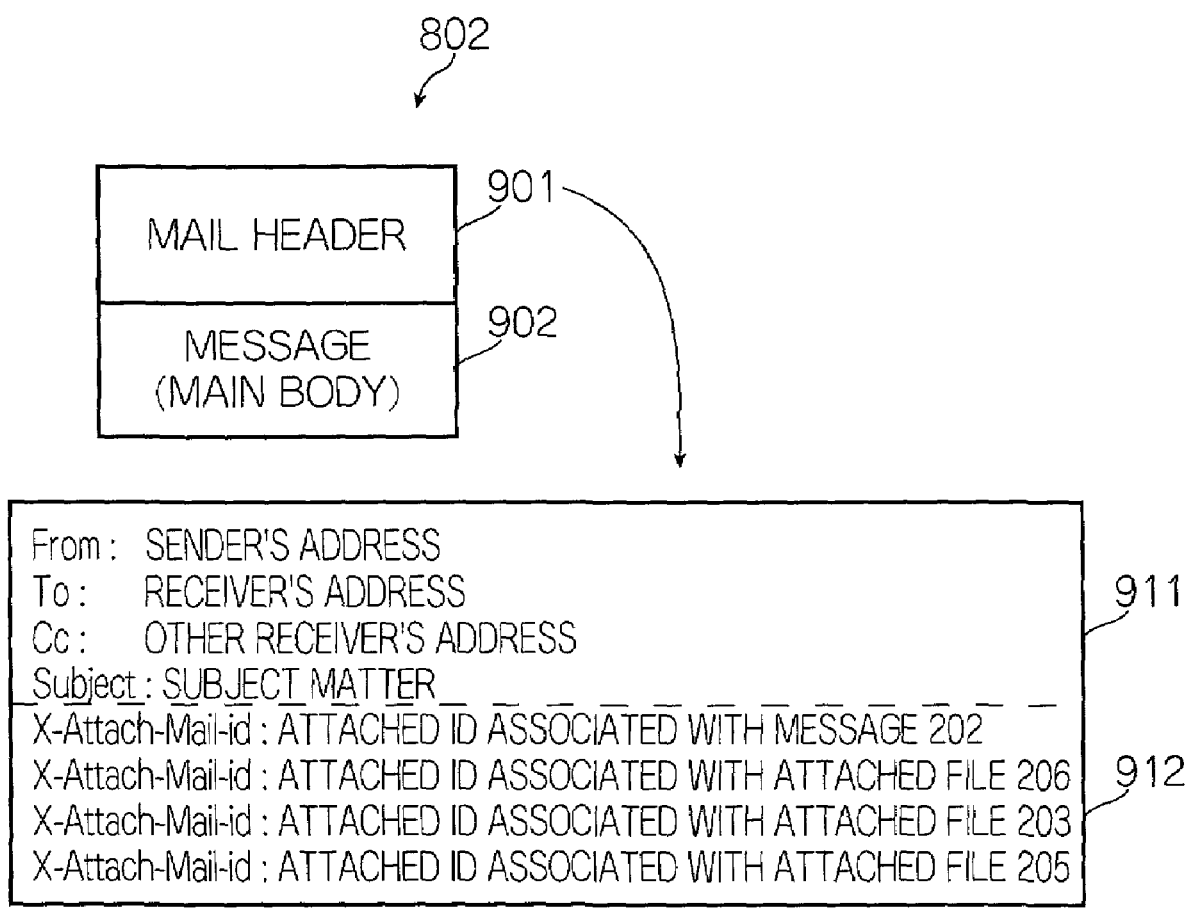
FIG. 9 shows an example of a data structure of the forwarded mail prepared by the mail preparation unit.

FIG. 9 shows an example of a data structure of the forwarded mail 802 prepared by the mail preparation unit 102.

As shown in FIG. 9, the forwarded mail 802 consists of a mail header 901 and a message 902. The mail header 901 consists of a sub header 911 including information on a sender, receivers' addresses, the other receivers' addresses, a subject matter and the like, and a sub header 912 including attached IDs. In the sub header 911, a forwarding address of the forwarded mail or the like is described. In the sub header 912, the attached IDs that are selected from the list of attached IDs that the ID acquisition unit 101 acquires are described. The order of the described attached IDs is the selected order and is also the order for attaching these IDs to the forwarded mail 802.

Here, as for the mail having an RFC 822 format, a character string which begins with "X-" can be used as a user-definable string. Therefore, in this embodiment, a field identifier is set at "X-Attach-Mail-id" in order to identify that the attached ID corresponds to the attached file and "X-Attach-Mail-id: attached ID" is described in the sub header 912.

The message 902 consists of text data and the content described there becomes the main body of the mail.

Next, referring back to FIG. 3, the mail terminal 100 passes the forwarded mail 802 prepared by the mail preparation unit 102 to the mail sending unit 103 which transmits the forwarded mail 802 to the mail gateway 110 (Step S303).

Figure 10:
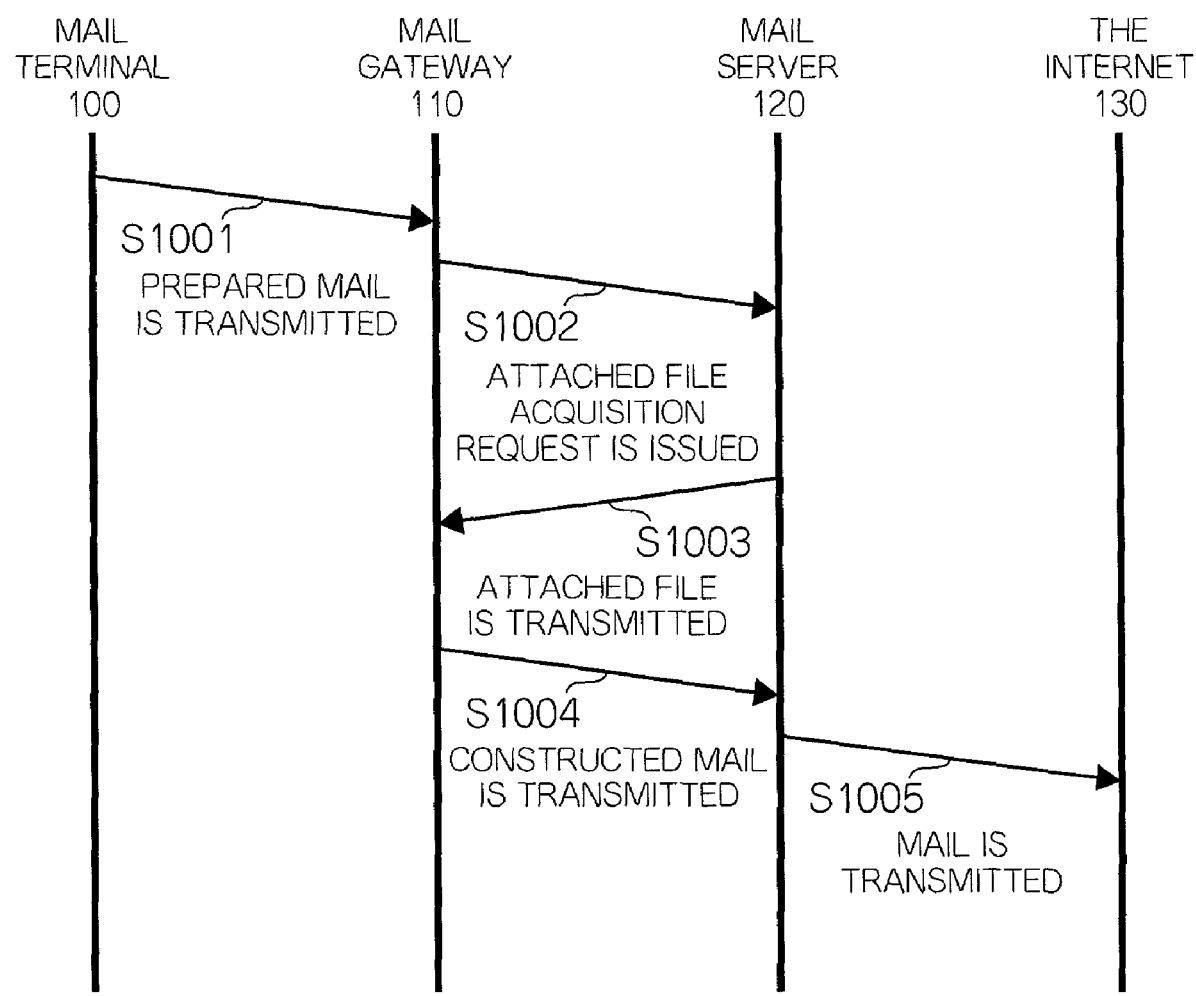
FIG. 10 shows a sequence for sending the forwarded mail prepared from the received mail by the mail preparation unit to the forwarding address.

FIG. 10 shows a sequence for sending the forwarded mail 802 prepared from the received mail 200 by the mail preparation unit 102 to the forwarding address.

As shown in FIG. 10, the mail terminal 100 sends the forwarded mail 802 prepared by the mail preparation unit 102 to the mail gateway 110 (S1001).

The mail gateway 110 receives the forwarded mail 802, analyzes the received forwarded mail 802, and extracts the attached ID described in a field identifier "X-Attach-Mail-id". Then, the mail gateway 100 issues a request for the acquisition of the attached file corresponding to the attached ID to the mail server 120 in accordance with the extracted attached ID (the attached ID described in the sub header 912) (S1002).

The mail server 120 receives the request for the acquisition of the attached file and transmits the attached file corresponding to the attached ID that is stored in the mail spool 122 to the mail gateway 110 (S1004).

The mail gateway 110 receives the attached file corresponding to the attached ID, and attaches the attached file corresponding to the received attached ID, as a substitute for the attached ID, to the mail so as to construct the forwarded mail 802. Then, the mail gateway 110 sends the constructed mail to the mail server 120 (S1004).

The mail server 120 receives the constructed mail and distributes the mail to the receivers' addresses (S1005).

Figure 11:
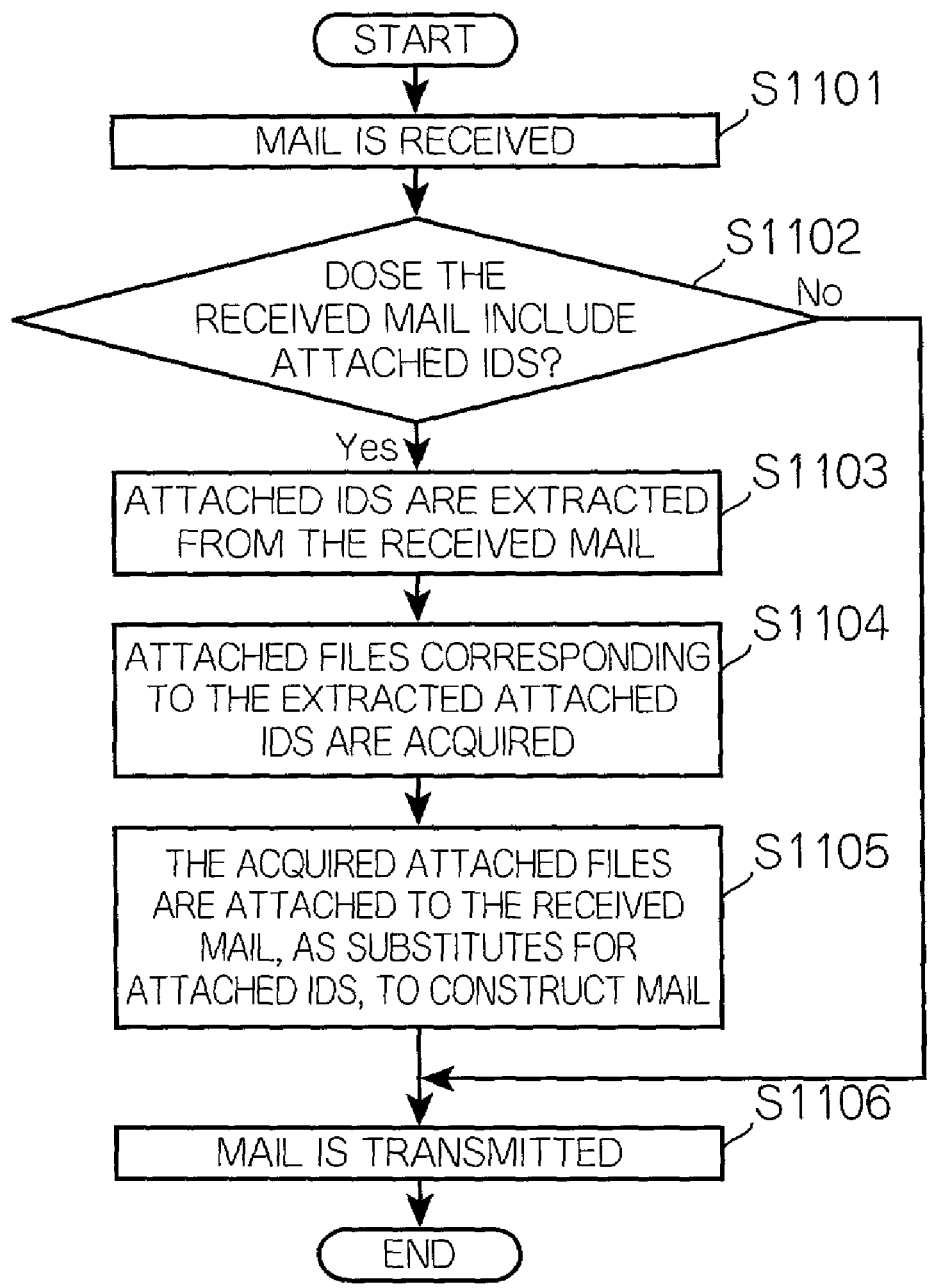
FIG. 11 is a flowchart showing a procedure for constructing the forwarded mail sent from the mail terminal by the mail gateway.

FIG. 11 is a flowchart showing a procedure for the mail gateway 110 to construct the forwarded mail sent from the mail terminal 100 (procedure from S1001 to S1004).

As shown in FIG. 11, the mail reception unit 114 in the mail gateway 110 receives the mail that is sent from the mail terminal 100 (Step S1101) and passes the received mail to the mail construction unit 113. Then, the mail construction unit 113 analyzes the mail to determine whether or not attached IDs are included (Step S1102).

As a result of the analysis, in a case where attached IDs are included, the mail gateway 110 extracts the attached IDs from the received mail (Step S1103) and acquires attached files corresponding to the attached IDs from the mail server 120 (Step S1102). Then, the mail gateway 110 attaches the acquired attached files, as a substitute for the attached IDs, to the mail to construct the mail (Step S1105). Finally, the mail gateway 110 passes the constructed mail to the mail sending unit 115 to transmit the constructed mail to the mail server 120 (Step S1106).

Alternatively, in a case where attached IDs are determined as not being included in Step S1102, the mail gateway 110 passes the received mail without being processed to the mail sending unit 115 to transmit the received mail to the mail server 120 (S1106).

Figure 12:
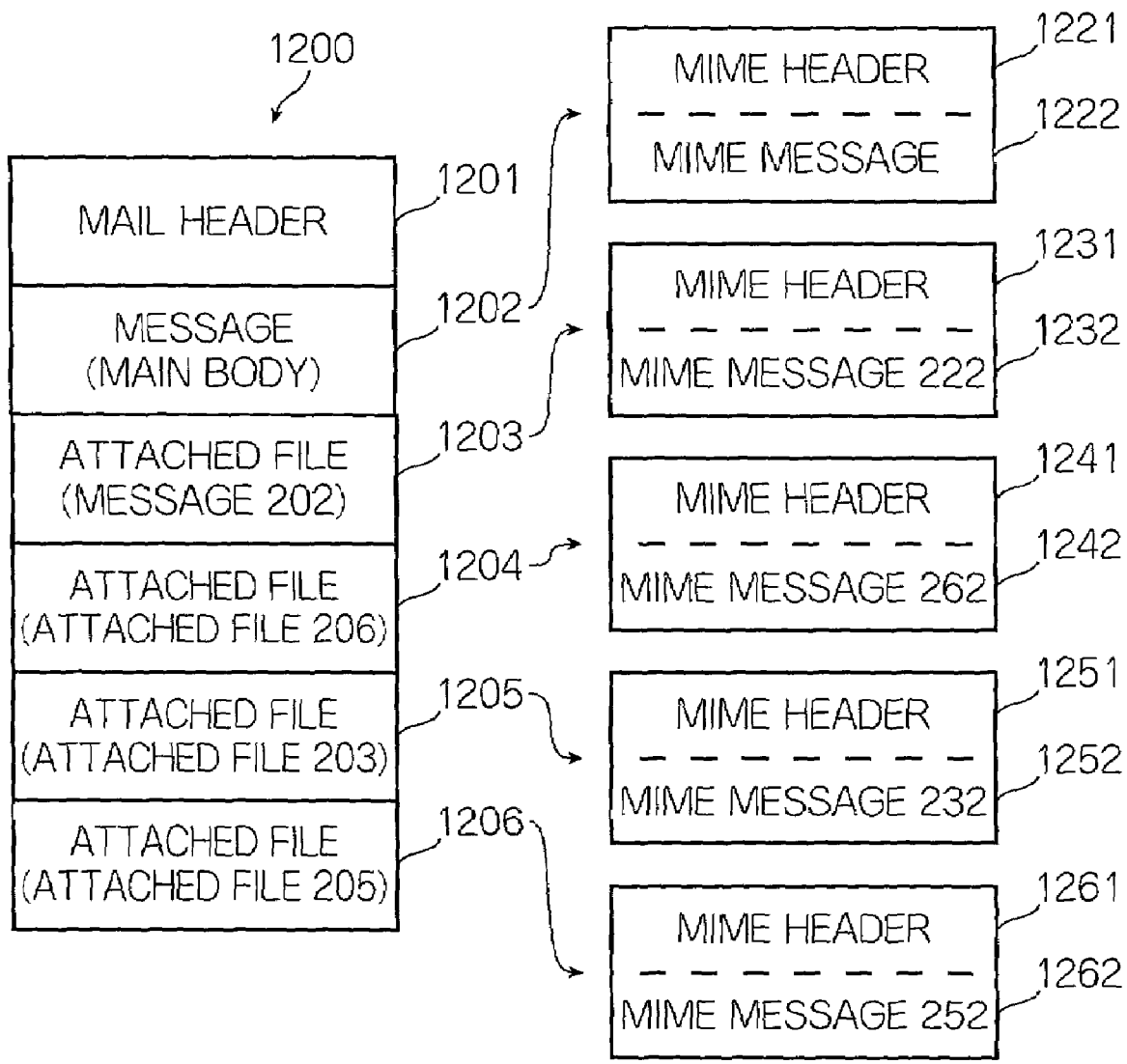
FIG. 12 shows a data structure of the mail constructed from the forwarded mail by the mail gateway.

FIG. 12 shows a data structure of the mail constructed from the forwarded mail 802 by the mail gateway 110.

As shown in FIG. 12, the constructed mail 1200 consists of a mail header 1201, a message 1202, and attached files 1203 through 1206.

Information for controlling the mail is described in the mail header 1201, and the information includes a sender, receivers' addresses, the other receivers' addresses, a subject matter, and the like.

The message 1202 consists of a MIME header 1221 and a MIME message 1222.

Each of the attached files 1203 through 1206 consists of a MIME header and a MIME message, and the attached files 1203, 1204, 1205, and 1206 correspond to a message 202, an attached files 206, 203, and 205, respectively.

As stated above, according to the e-mail transmission/reception system of this embodiment, an attached ID is associated with each of the attached files that are included in the received mail 200, and forwarded mail 802 corresponding to the received mail 200 is prepared by the mail terminal 100 by using the associated attached IDs. Further, the constructed mail 1200 is constructed from the forwarded mail 802 by the mail gateway 110. Finally, the constructed mail 1200 is distributed as a substitute for the forwarded mail 802 from the mail server 120 to the receivers' addresses of the mail.

[Modifications]

In the above embodiment, the mail terminal 100 is a mobile information terminal. However, the mail terminal 100 may be a cellular phone, a handheld PC, a personal computer (PC), or the like.

In the above embodiment, the mail terminal 100 acquires attached IDs for each piece of e-mail. However, the mail terminal 100 may acquire attached files which correspond to a plurality of attached files that are included in a plurality pieces of e-mail.

As for the mail terminal 100 in this embodiment, when preparing a new e-mail with an attached file by using a plurality of attached files that are included in the stored plurality pieces of e-mail, the new e-mail may include an attached ID corresponding to the attached file as a substitute for the attached file.

In the above embodiment, the mail gateway 110 associates attached IDs with attached files for each piece of e-mail. However, the mail gateway 110 may associate attached IDs with attached files by using a list that is prepared by bringing together a plurality of lists of attached files, in which each of the lists are included in a piece of e-mail.

In the above embodiment, the mail server 120 transmits a list of attached files in accordance with a request for the acquisition of a list of attached files from the mail gateway 110. However, whenever e-mail addressed to the user having the mail terminal 100 is received, the mail server 120 may transmit a list of attached files that are included in the received mail to the mail gateway 110.

In the above embodiment, a list of attached files includes header information consisting of a mail header and a MIME header of the received mail. However, this may not be header information on the received mail, but may be any information which is prepared from the header information on the received mail and by which attached files can be identified. For example, this may be a list of file names of the attached files, or simply the number of attached files.

In the above embodiment, a format of the attached IDs is set at "message ID: the attached order of the attached file". However, this may be set at "message ID: the attached order of the attached file: file name of the attached file". In the above embodiment, a list of attached files is browsed by using MUA provided in the mail terminal 100. However, this procedure may be performed by using WWW browser software.

The mail gateway 110 and the mail server 120 may be constructed by an integrated computer system.

The e-mail transmission/reception system of this embodiment can be realized by providing a program for attaching an attached file corresponding to an attached ID and constructing mail and a program for preparing e-mail with the attached ID corresponding to the attached file that should be attached and by running these programs on general hardware such as computers. If these programs are recorded on recording media such as CD-ROMs that are readable for computers, they can be run on another computer. Further, these programs can be run on a computer which downloads them via communication media such as networks.

Second Embodiment

Figure 13:
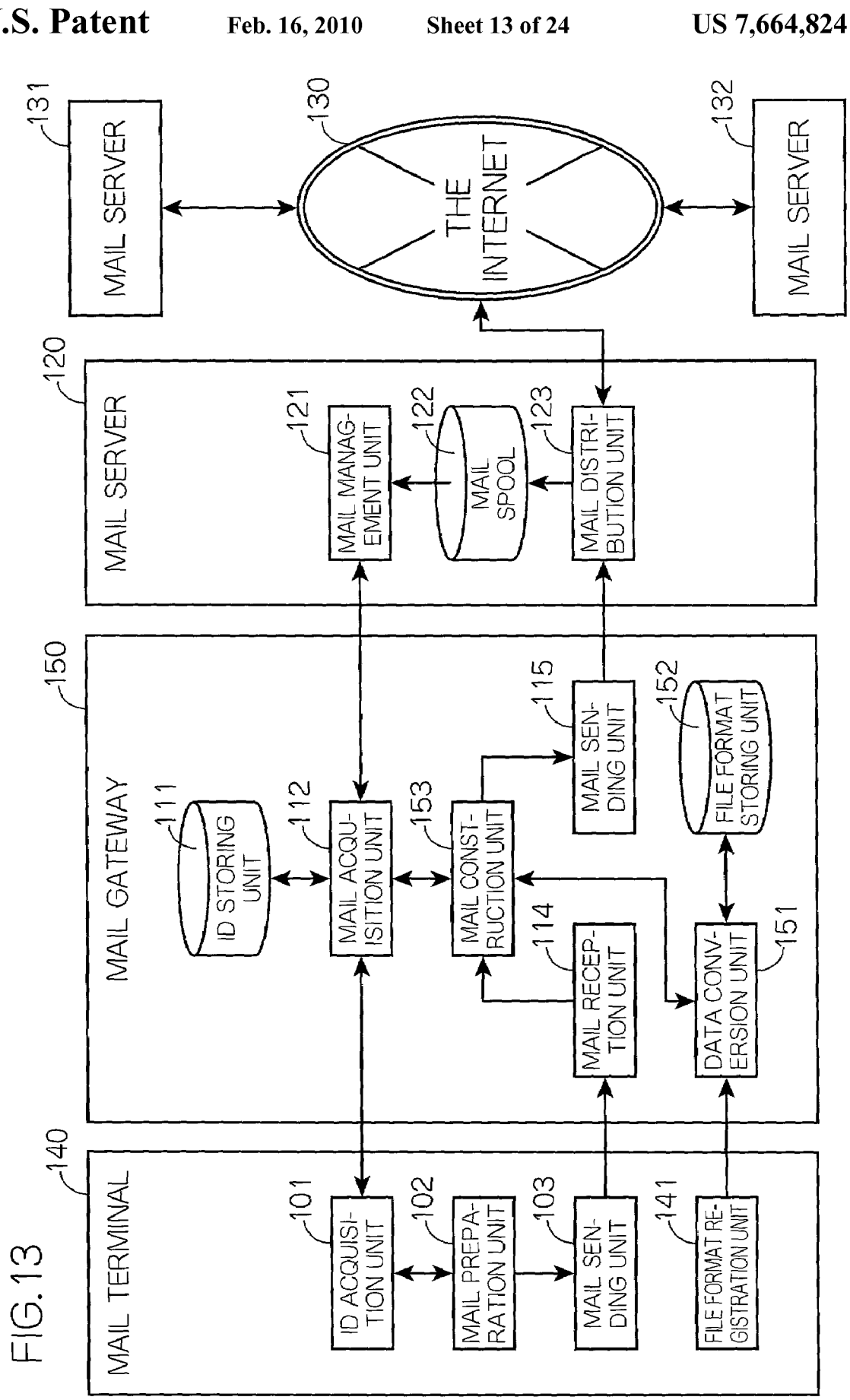
FIG. 13 is a block diagram showing the construction of the e-mail transmission/reception system including a mail terminal, a mail gateway, and a mail server.

FIG. 13 is a block diagram showing the construction of the e-mail transmission/reception system according to the second embodiment of the present invention including a mail terminal 140, a mail gateway 150, and a mail server 120.

FIG. 13 is different from the construction in FIG. 1 in that the mail terminal 140 and the mail gateway 150 are provided as substitutes for the mail terminal 100 and the mail gateway 110, respectively. In the following description, an explanation for the elements which are the same as those in FIG. 1 will be omitted, but elements which are different from those in FIG. 1 will be focused on.

[Different Elements from the Mail Terminal 100]

As shown in FIG. 13, the mail terminal 140 is different from the mail terminal 100 in that a file format registration unit 141 is further provided.

The file format registration unit 141 transmits file format conversion information including a receiver's address of the mail and a file format of the attached files which should be adopted by the receiver to the mail gateway 150.

[Different Elements from the Mail Gateway 110]

The mail gateway 150 is different from the mail gateway 110 in that a mail construction unit 153 is provided as a substitute for the mail construction unit 113, and a data conversion unit 151 and a file format storing unit 152 are further provided.

The data conversion unit 151 receives file format conversion information transmitted from the mail terminal 140 and stores the information in the file format storing unit 152. In addition, the data conversion unit 151 converts a file format of the attached file that is passed from the mail construction unit 153 for each receiver's address in accordance with the file format conversion information stored in the file format storing unit 152. Then, the data conversion unit 151 passes the converted attached file to the mail construction unit 153.

The file format storing unit 152 stores file format conversion information for each receiver's address.

The mail construction unit 153 is different from the mail construction unit 113 shown in FIG. 1 in that the mail construction unit 153 further passes attached files acquired by the mail acquisition unit 112 and a receiver's address of the attached file to the data conversion unit 151, receives the attached files that are converted by the data conversion unit 151, and constructs the mail for each receiver's address.

[Different Operations from the First Embodiment]

As for the e-mail transmission/reception system having the above-mentioned construction, the following explanation of the operations of the second embodiment will mainly focus on the differences between the first and second embodiments.

Figure 14:
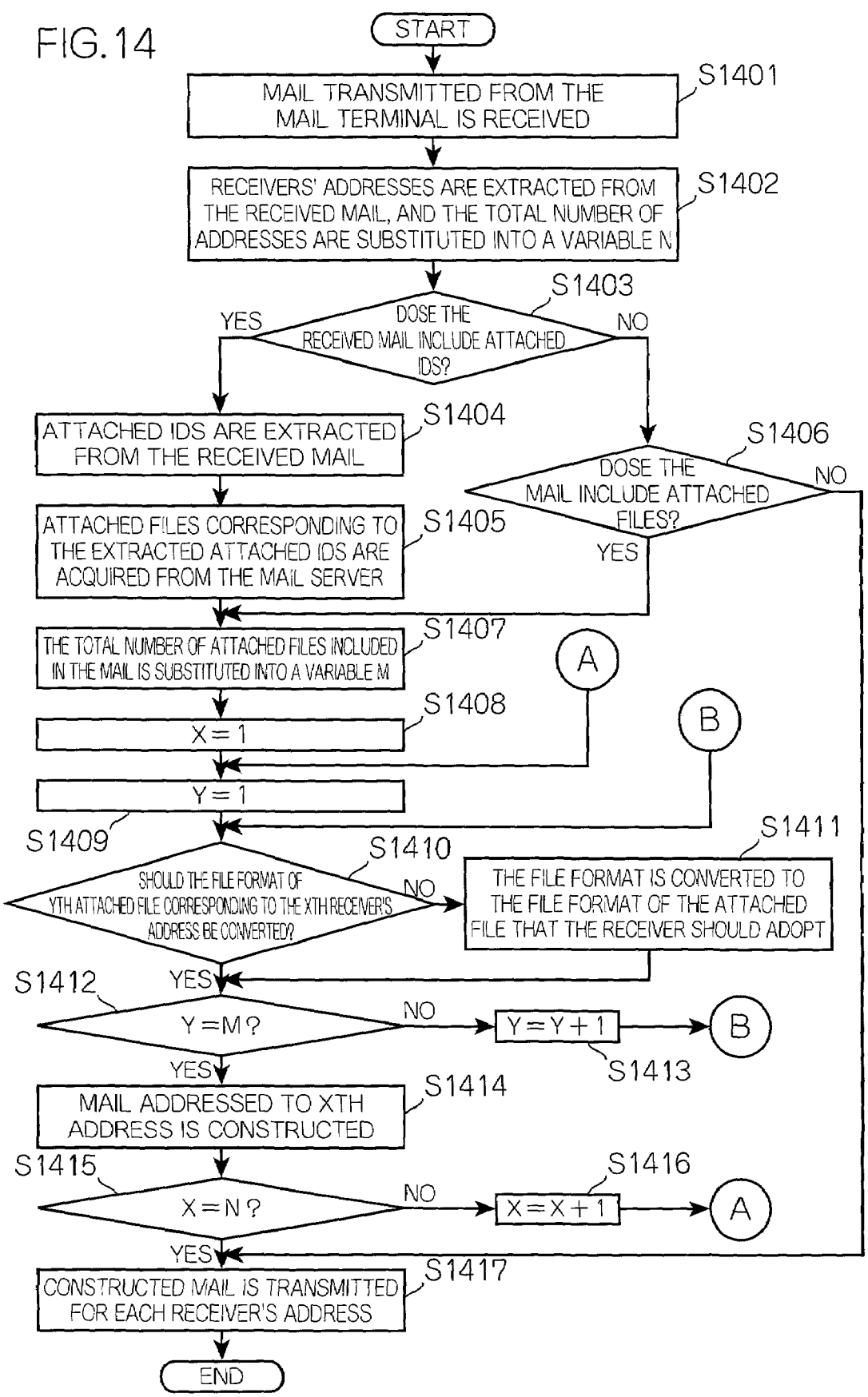
FIG. 14 is a flowchart showing a procedure for converting an attached file for each of the receivers' addresses and a procedure for constructing the converted attached file for each of the receivers' addresses by the mail gateway.

FIG. 14 is a flowchart showing a procedure for converting an attached file for each of the receivers' addresses and a procedure for constructing the converted attached file for each of the receivers' addresses by the mail gateway 150.

As shown in FIG. 14, the mail reception unit 114 in the mail gateway 150 receives the mail sent from the mail terminal 140 (Step S1401). When the received mail is passed to the mail construction unit 153, the mail construction unit 153 extracts a receiver's address of the mail and substitutes the total number of the receivers' addresses into a variable N (Step S1402). Then, the mail gateway 150 analyzes whether or not attached IDs are included in the received mail (Step S1403).

As a result of the analysis, in a case where attached IDs are included, the mail gateway 150 extracts the attached IDs that are associated with the attached files from the mail (Step S1404), and acquires the attached files corresponding to the extracted attached IDs from the mail server 120 (Step S1405). Alternatively, in a case where attached IDs are not included, the mail gateway 150 checks the number of attached files that are included in the mail (Step S1406). In a case where the mail does not include attached files, the mail gateway 150 then passes the received mail without being processed to the mail sending unit 115 so as to transmit the received mail to the mail server 120 (Step S1417).

Next, the mail gateway 150 substitutes the total number of attached files included in the mail into a variable M (S1407), substitutes 1 into a variable X (Step S1408), and substitutes 1 into a variable Y (Step S1409).

Then, the mail gateway 150 checks a file format of the Yth attached file corresponding to the Xth receiver's address in accordance with file format conversion information stored in the file format storing unit 152 (Step S1410).

In a case where the receiver's address and the file format of the attached file that the receiver should adopt correspond to each other, the mail gateway 150 converts the format of the attached file into the file format that the receiver should adopt (Step S1411).

Next, the mail gateway 150 judges whether or not the variable Y equals the variable M (Step S1412). In a case where the variables Y and M are not equal, 1 is then added to the variable Y and the procedure returns to the Step S1410 (Step S1413).

In a case where the variables Y and M are equal, the mail gateway 150 attaches the acquired attached file or the converted attached file as a substitute for the attached ID or the attached file to the mail addressed so as to the Xth receiver's address to construct mail (Step S1414).

Next, the mail gateway 150 judges whether or not the variable X equals the variable N (Step S1415). In a case where the variables X and N are not equal, 1 is then added to the variable X and the procedure returns to the Step S1409 (Step S1416). In a case where the variables X and N are equal, the mail gateway 150 passes the mail constructed for each receiver's address to the mail sending unit 115 so as to transmit the constructed mail to the mail server 120 (Step S1417).

Figure 15:
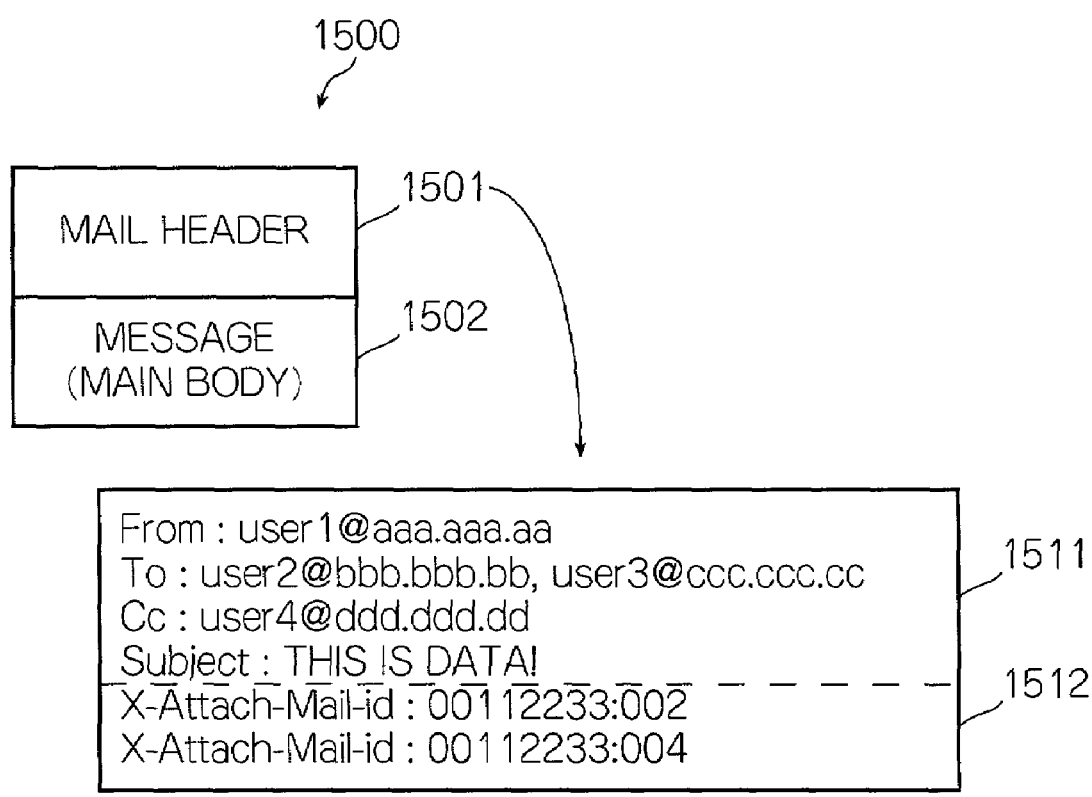
FIG. 15 shows a data structure of the mail sent from the mail terminal.

FIG. 15 shows a data structure of the e-mail (prepared by the mail preparation unit 102) sent from the mail terminal 140.

As shown in FIG. 15, the mail 1500 consists of a mail header 1501 and a message 1502.

In the mail header 1501, sender (From: user1@aaa.aaa.aa), receivers' addresses (To:user2@bbb.bbb.bb, user3@ccc.ccc.cc), the other receivers' addresses (Cc: user4@ddd.ddd.dd), and a subject matter (Subject: this is data!) are described. In addition, attached IDs which are associated with the attached files that should be attached to the mail 1500 are described (X-Attach-Mail-id: 00112233: 002 and X-Attach-Mail-id: 00112233:004).

The message 1502 consists of text data and the content described there becomes the main body of the mail.

Here, an attached file which is associated with the attached ID "00112233:002" is a document file whose file name is "shiryou1.doc" and an attached file which is associated with the attached ID "00112233:004" is an image file whose file name is "shiryou2.bmp".

Figure 16:
FIG. 16 is an example of a table indicating information on file format conversion stored in the file format storing unit.

FIG. 16 is an example of file format conversion information stored in the file format storing unit 152.

As shown in FIG. 16, the file format storing unit 152 stores a correspondence table 1600 between receivers' addresses and file formats of attached files that the receiver should adopt.

FIGS. 17A, 17B, and 17C show an example of a data structure of the mail constructed by using the mail 1500 for each of the receivers' addresses. In constructing the mail, file formats of the attached files are converted for each receiver's address in accordance with the file format conversion information shown in the correspondence table 1600.

As shown in FIGS. 17A-17C, three pieces of e-mail 1700 (receiver's address: user2@bbb.bbb.bb), 1701 (receiver's address: user3@ccc.ccc.cc), and 1702 (receiver's address: user4@ddd.ddd.dd) are prepared from a piece of e-mail 1500.

As stated above, according to the e-mail transmission/reception system of this embodiment, when forwarding attached files that are included in the received mail, file formats of the attached files are converted for each receiver's address so as to construct the mail. Therefore, the system can deliver e-mail including attached files to a plurality of receivers' addresses, in which considerations are given to the attached files for each receiver's address.

[Modifications]

In the above embodiment, the mail terminal 140 may register file format conversion information in the mail gateway 150 by means of WWW browser software.

Third Embodiment

Figure 18:
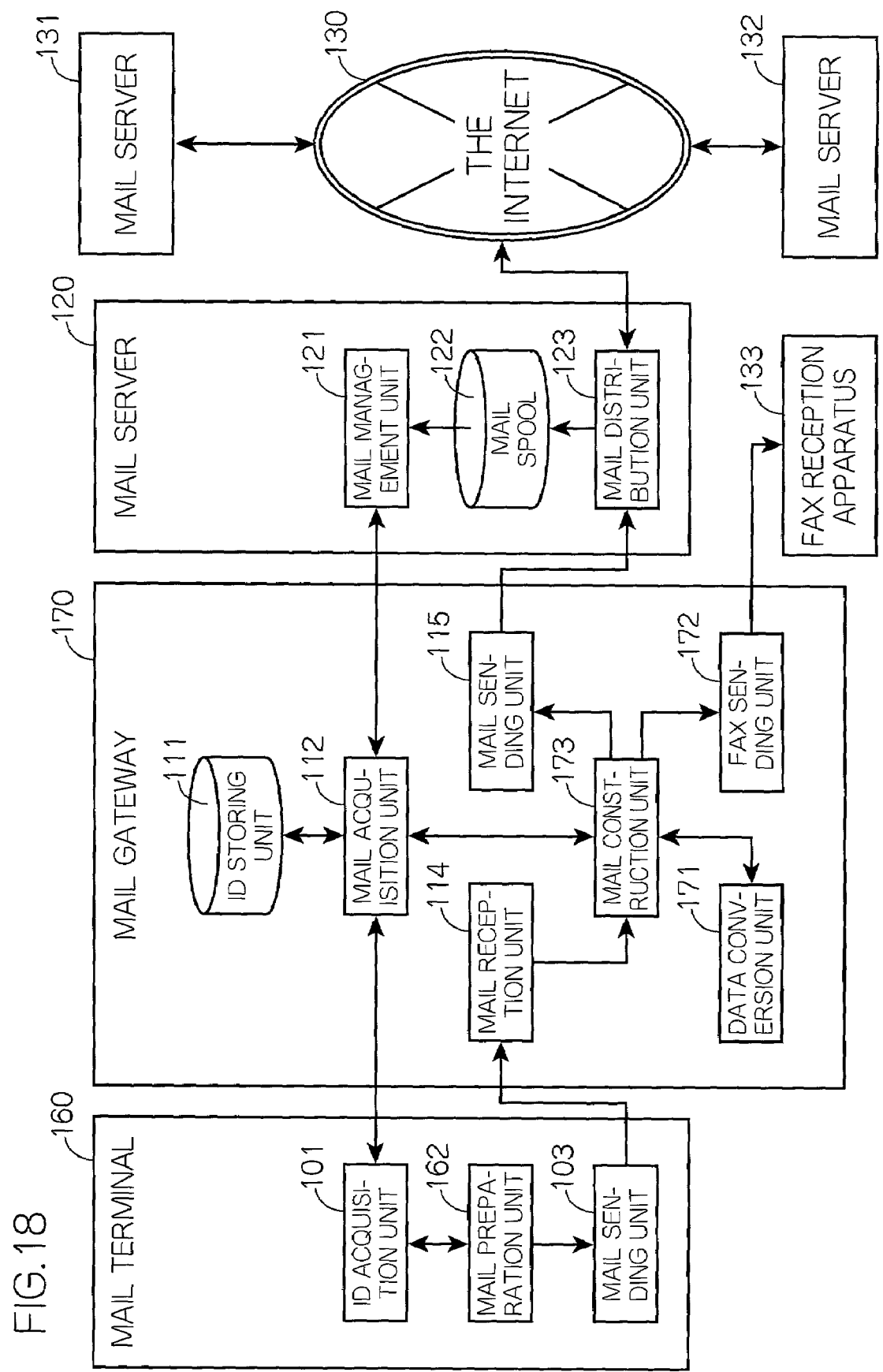
FIG. 18 is a block diagram showing the construction of the e-mail transmission/reception system including a mail terminal, a mail gateway, and a mail server.

FIG. 18 is a block diagram showing the construction of the e-mail transmission/reception system according to the third embodiment of the present invention including a mail terminal 160, a mail gateway 170, and a mail server 120.

FIG. 18 is different from the construction in FIG. 1 in that the mail terminal 160 and the mail gateway 170 are provided as substitutes for the mail terminal 100 and the mail gateway 110, respectively. In the following description, an explanation for the elements which are the same as those in FIG. 1 will be omitted, but elements which are different from those in FIG. 1 will be focused on.

[Different Elements from the Mail Terminal 100]

The mail terminal 160 is different from the mail terminal 100 in that a mail preparation unit 162 is provided as a substitute for the mail preparation unit 102.

The mail preparation unit 162 is different from the mail preparation unit 102 shown in FIG. 1 in that a data format of a field "X-Attach-Mail-id" described in the mail header is set at "X-Attach-Mail-id: attached ID: processing information on attached files" instead of "X-Attach-Mail-id: attached Id".

Here, the processing information on attached files specifies a process in which the mail gateway 170 processes attached files corresponding to the attached IDs that are selected by the user (e.g., conversion of file formats of the attached files) and this means information consisting of "file formats of the attached files" which are to be converted and "receiver's addresses of the converted attached files".

That is, as for the mail whose mail header has a description "X-Attach-Mail-id: attached ID: processing information of the attached files", a file format of the mail is converted into the file format which is designated by the "file format of the attached files" included in the "processing information of the attached files", and the converted attached files are transmitted to the receiver's address which is designated by the "receiver's address of the attached files" included in the "processing information on the attached files".

Here, the format of the "processing information on the attached files" in this embodiment is set at "file format of the attached files: receiver's address of the attached files". In addition, the "file format of the attached files" and the "receiver's address of the attached files" in the processing information on the attached information may be omitted. In a case where the former is omitted, the attached file corresponding to the "attached ID" is transmitted to the receiver's address which is designated by the "receiver's address of the attached files" in the "processing information on the attached files". In a case where the latter is omitted, the attached file corresponding to the "attached ID" is converted to the file format which is designated by the "file format of the attached files" in the "processing information on the attached files" and attaches the converted attached file to the mail.

[Different Constructions from the Mail Gateway 110]

The mail gateway 170 is different from the mail gateway 110 in that a data conversion unit 173 is provided as a substitute for a mail conversion unit 113, and a data conversion unit 171 and a fax sending unit 172 are further provided.

The data conversion unit 171 receives attached files and a file format to which the attached files should be converted from the mail construction unit 173, and converts a file format of the attached files. Then, the data conversion unit 171 passes the converted attached files to the mail construction unit 173.

The FAX sending unit 172 receives the attached files (converted in a FAX form) from the mail construction unit 173 and a FAX receiver's address, and faxes the attached files to the FAX receiver's address.

The mail construction unit 173 is different from the mail construction unit 113 in that the mail construction unit 173 further passes the attached files that are acquired by the mail acquisition unit 112 and the processing information (a file format and a receiver's address) on the attached files which is described in the mail header to the data conversion unit 171, receives the attached files converted by the data conversion unit 171, and constructs mail for each receiver's address of the attached files. The constructed mail is passed to the mail sending unit 115, and the attached files to be faxed are passed to the FAX sending unit 172 as well as the FAX number of the receiver.

[Different Operations from the First Embodiment]

As for the e-mail transmission/reception system according to the third embodiment having the above-mentioned construction, the following explanation of the operations of the third embodiment mainly focus on the differences between the first and third embodiments.

The mail preparation unit 162 prepares mail whose mail header has the description "X-Attach-Mail-id: attached ID: processing information on the attached files". The prepared mail is passed to the mail sending unit 103 to be transmitted to the mail gateway 170. The mail gateway 170 that receives the mail from the mail terminal 160 performs a process for the attached file corresponding to the "attached ID" that is described in the mail header in accordance with the "processing information on the attached files" that is described in the mail header.

Figure 19:
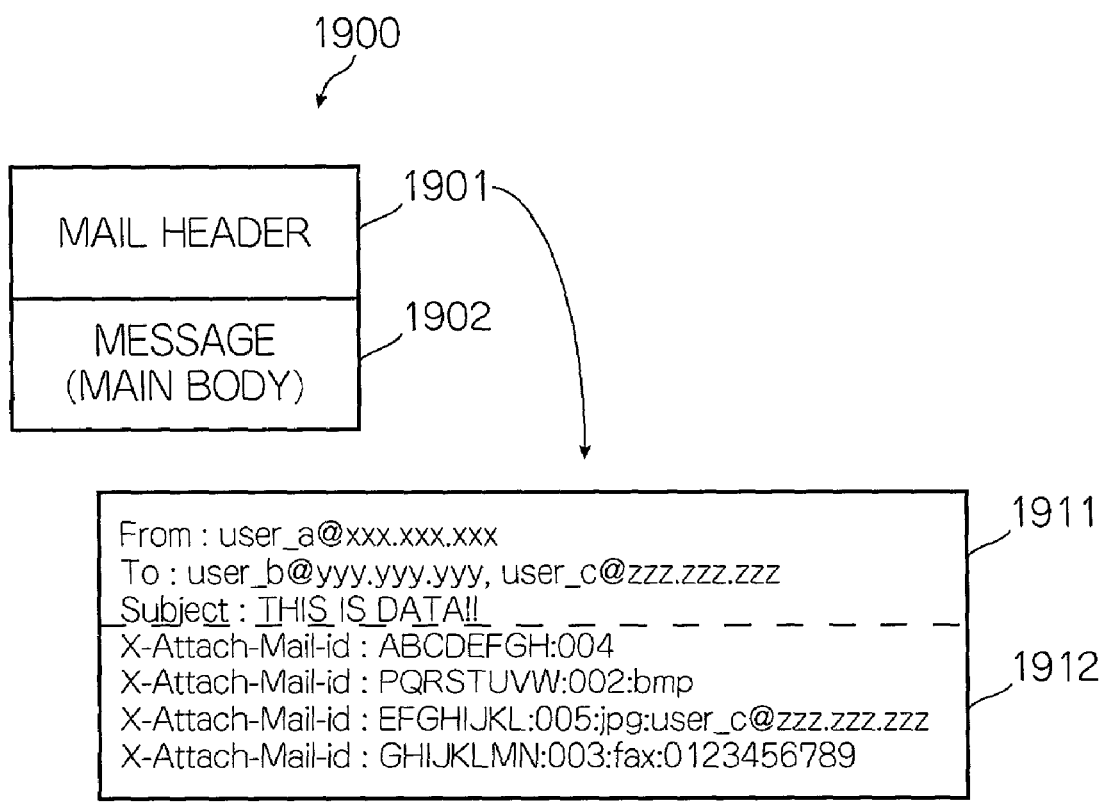
FIG. 19 shows an example of a data structure of the mail prepared by the mail preparation unit.

FIG. 19 shows an example of a data structure of the mail prepared by the mail preparation unit 162.

As shown in FIG. 19, the mail 1900 consists of a mail header 1901 and a message 1902. The mail header 1901 includes a sub header 1911 in which a sender (From: user_a@xxx.xxx.xxx), receivers' addresses (To: user_b@yyy.yyy.yyy, user_c@zzz.zzz.zzz) and a subject matter (Subject: this is data!!) are described, and a sub header 1912 in which attached IDs that are associated with the attached files that should be attached are described.

For instance, suppose that file names of the attached files corresponding to "ABCDEFGH:004", "PQRSTUVW:002", "EFGHIJKL:005", and "GHIJKLMN:003:fax" are respectively set at "File1.txt", "File2.gif", "File3.bmp", and "File4.jpg". In this case, the mail gateway 170 that receives the mail 1900 performs the following process in accordance with the description of the sub header 1912.

The fourth attached file (when counting from the top in the mail) included in the mail "message ID: ABCDEFGH" is attached to the mail ("X-Attach-Mail-id: ABCDEFGH: 004").

The second attached file (when counting from the top in the mail) included in the mail "message ID: PQRSTUVW" is converted to a bmp format, and the converted attached file (whose file name is changed to "File2.bmp" after conversion) is attached to the mail ("X-Attach-Mail-id: PQRSTUVW: 002:bmp").

The fifth attached file (when counting from the top in the mail) included in the mail "message ID: EFGHIJKL" is converted to a jpg format, and the converted attached file (whose file name is changed to "File3.jpg" after conversion" is attached to the mail addressed to the receiver's address (user_c@zzz.zzz.zzz) ("X-Attach-Mail-id:EFGHIJKL:005: jpg:user_c@zzz.zzz.zzz").

The third attached file (when counting from the top in the mail) included in the mail "message ID:GHIJKLMN" is converted to a FAX format, and the converted attached file is faxed to the fax number "0123-45-6789" ("X-Attach-Mail-id: GHIJKLMN:003:fax:0123456789").

As a result of the process by the mail gateway 170, e-mail is constructed for each receiver's address from the mail 1900.

Figure 20A:
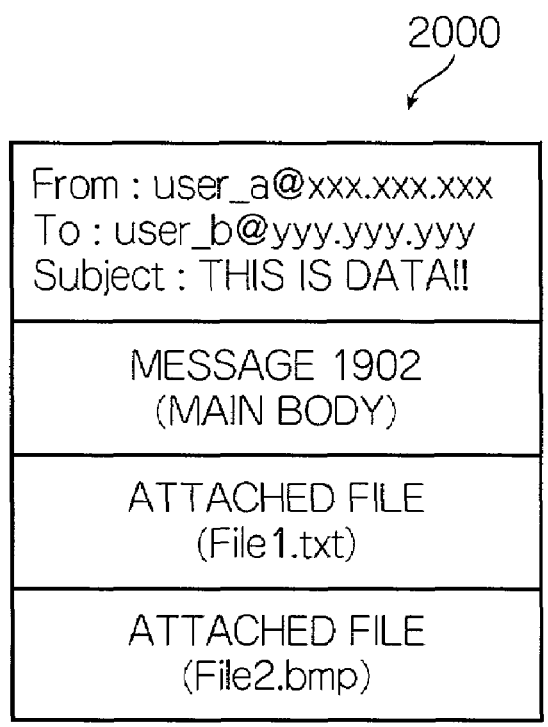
FIGS. 20A and 20B show an example of a data structure of the mail constructed for each of the receivers' addresses.
Figure 20B:
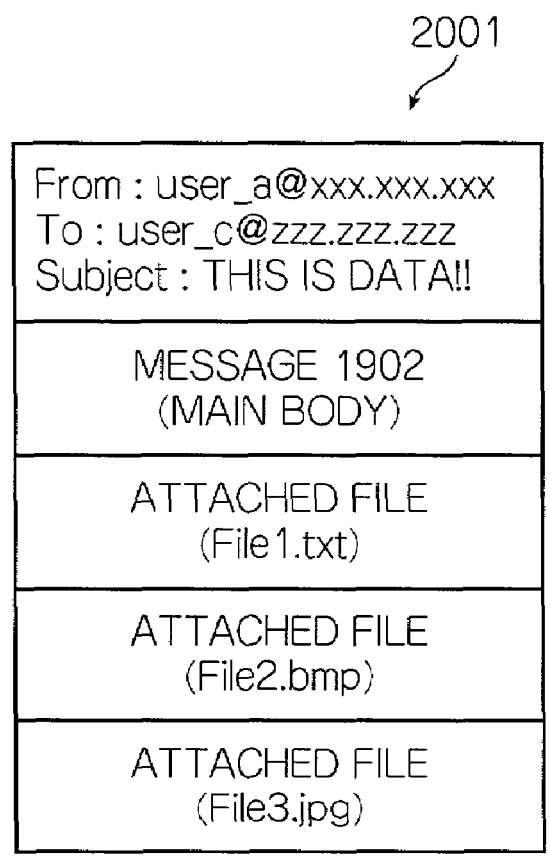

FIGS. 20A and 20B show an example of a data structure of the mail constructed for each receiver's address from the mail 1900. Here, FIG. 20A shows constructed mail 2000 addressed to a receiver's address (user_b@yyy.yyy.yyy), and FIG. 20B shows constructed mail 2001 addressed to a receiver's address (user_c@zzz.zzz.zzz).

As shown in these drawings, when specifying "receiver's address of the attached files" in the "processing information on the attached files", the attached files are attached to the mail addressed to only the specified receivers' addresses. When specifying a FAX format in the "file format of the attached files" and a FAX number in the "receiver's address of the attached files", the attached file corresponding to the specified attached ID is converted to a FAX format and the converted attached file is faxed to the specified FAX number.

As described above, according to the e-mail transmission/reception system of this embodiment, when forwarding each of the attached files that are included in the received mail, file formats of the attached files are converted for each receiver's address so as to construct the mail. In addition, according to this embodiment, each attached file can be faxed and printed by the fax as a handy printer. Thereby, the content of the received attached file can be confirmed by a user, even when the user does not have a tool for receiving e-mail.

[Modifications]

In the above embodiment, the mail gateway 170 may inform a sender of the mail and a receiver of the fax that the attached files cannot be converted to a FAX format in the case where the attached files cannot be converted to a FAX format (e.g., sound information, moving video information).

Fourth Embodiment

Figure 21:
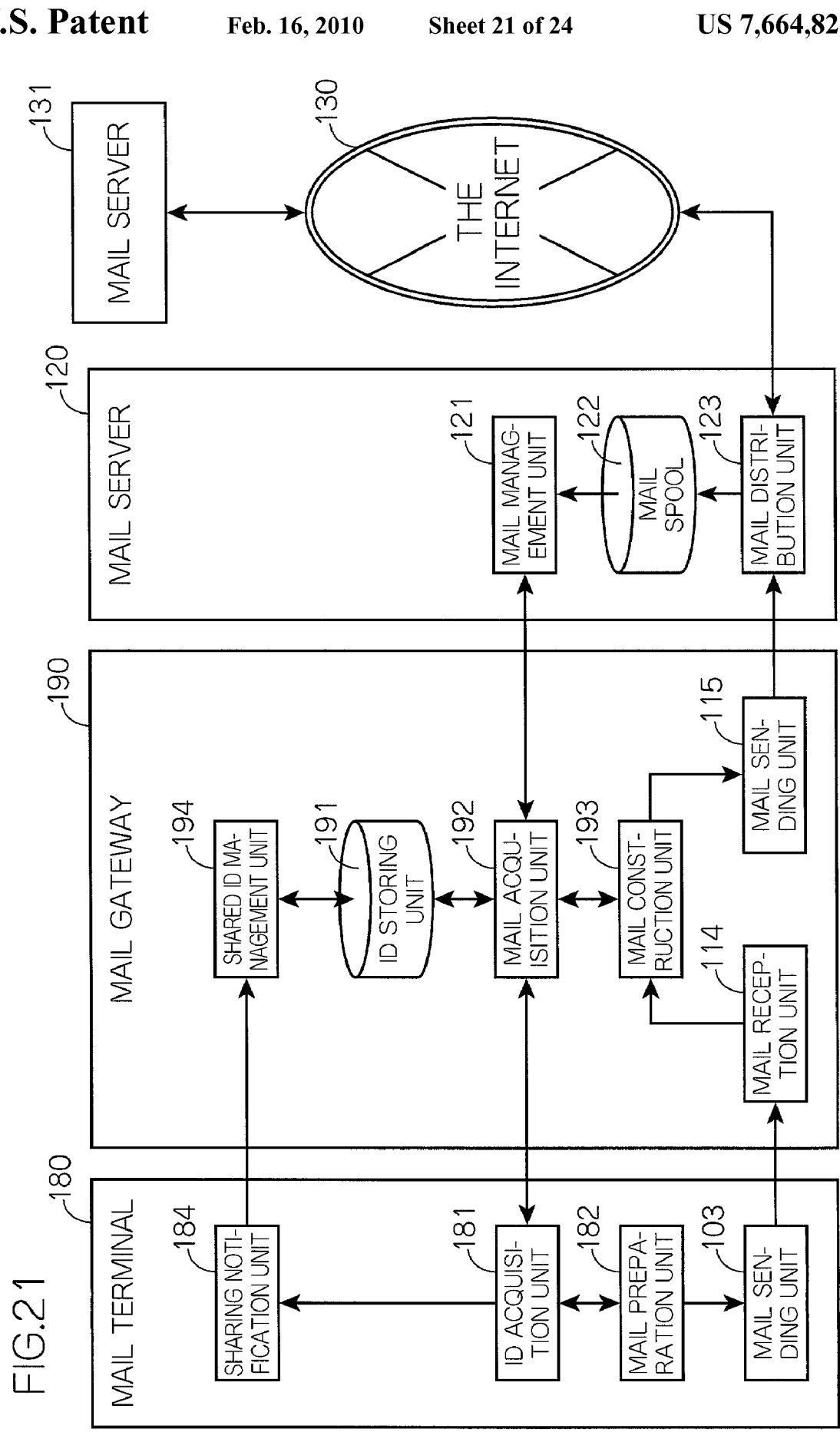
FIG. 21 is a block diagram showing the construction of the e-mail transmission/reception system including a mail terminal, a mail gateway, and a mail server.

FIG. 21 is a block diagram showing the construction of the e-mail transmission/reception system according to the fourth embodiment of the present invention including a mail terminal 180, a mail gateway 190, and a mail server 120.

FIG. 21 is different from the construction shown in FIG. 1 in that the mail terminal 180 and the mail gateway 190 are provided as substitutes for the mail terminal 100 and the mail gateway 110, respectively. In the following description, an explanation for the elements which are the same as those in FIG. 1 will be omitted, but elements which are different from those in FIG. 1 will be focused on.

[Different Constructions from the Mail Terminal 100]

As shown in FIG. 21, the mail terminal 180 is different from the mail terminal 100 in that an ID acquisition unit 181 and a mail preparation unit 182 are provided as substitutes for the ID acquisition unit 101 and the mail preparation unit 102, respectively, and a sharing notification unit 184 is further provided.

The ID acquisition unit 181 is different from the ID acquisition unit 101 shown in FIG. 1 in that the ID acquisition unit 181 notifies the sharing notification unit 184 of the attached files that should be shared with the other users out of the attached files that are sent to the user having the mail terminal 180. In this case, the ID acquisition unit 181 passes, to the sharing notification unit 184, the attached IDs which are associated with the attached files that should be shared with the other users and which are selected from the list of the attached IDs that the ID acquisition unit 181 acquires. In addition, the ID acquisition unit 181 acquires a list of shared IDs which are associated with the attached files that are owned by the other users and the user having the mail terminal 180 shares. Then, the acquired list of the shared IDs is passed to the mail preparation unit 182.

Here, the shared IDs are not identifiers that are associated with files by the mail acquisition unit 192 but are identifiers that are associated with files by the shared ID management unit 194 and that are available only for sharers (shared users) of the attached files which are associated with the shared IDs.

The mail preparation unit 182 is different from the mail preparation unit 102 shown in FIG. 1 in that the mail preparation unit 182 can specify the attached files that should be forwarded by the shared IDs that is in accordance with the list of shared IDs passed from the ID acquisition unit 181. Here, the shared IDs may be specified as "X-Attach-Mail-id: shared Id" in the mail header instead of "X-Attach-Mail-id: attached ID".

The sharing notification unit 184 receives attached IDs from the ID acquisition unit 181, specifies a user (sharer) who shares the attached files corresponding to the attached IDs, and transmits shared information including the attached IDs and the sharers who share the attached files to the mail gateway 190. Here, sharers can be specified for only the attached files that are owned by the user having the mail terminal 180.

[Different Constructions from the Mail Gateway 110]

The mail gateway 190 is different from the mail gateway 110 in that an ID storing unit 191, a mail acquisition unit 192, a mail construction unit 193 are provided as substitutes for the ID storing unit 111, the mail acquisition unit 112, and the mail construction unit 113, respectively, and a shared ID management unit 194 is further provided.

The ID storing unit 191 is different from the ID storing unit 111 shown in FIG. 1 in that the ID storing unit 191 further stores a list of shared IDs which are associated with files by the shared ID management unit 194.

FIG. 22 is a correspondence table consisting of "shared IDs", "attached IDs", and "sharers", in which the table is stored in the ID storing unit 191.

The mail acquisition unit 192 is different from the mail acquisition unit 112 shown in FIG. 1 in that the mail acquisition unit 192 further transmits a list of shared IDs that is stored in the ID storing unit 191 to the mail terminal 180 in response to an ID acquisition request from the mail terminal 180. In addition, the mail acquisition unit 192 acquires the attached files (which correspond to the attached IDs that corresponds to the shared IDs and which are owned by the other users) corresponding to the shared IDs from the mail server 120 in response to a request for the acquisition of the attached files from the mail construction unit 193 and on the basis of the correspondence between the list of attached IDs and the list of shared IDs which are stored in the ID storing unit 191.

The mail construction unit 193 is different from the mail construction unit 113 shown in FIG. 1 in that, in a case where the received mail includes shared IDs, the mail construction unit 193 extracts the shared IDs, issues a request for the acquisition of the attached files corresponding to the shared IDs to the mail acquisition unit 192, and acquires the attached files from the mail acquisition unit 192. In this case, a sender of the mail must belong to sharers of the attached files.

The shared ID management unit 194 receives shared information transmitted from the mail terminal 180, generates and associates shared IDs from the shared information for each attached ID of the shared information, associates "attached IDs" and "sharers" with the "shared IDs", and stores them in the ID storing unit 151. Here, in a case where the shared IDs have been associated with attached IDs in the shared information, the shared ID management unit 194 adds the shares of the shared information to the sharers corresponding to such shared IDs.

[Different Operations from the Mail Terminal 180]

As for the e-mail transmission/reception system according to the fourth embodiment having the above-mentioned construction, the following explanation of the fourth embodiment the operations will mainly focus on the differences between the first and fourth embodiments.

Figure 23:
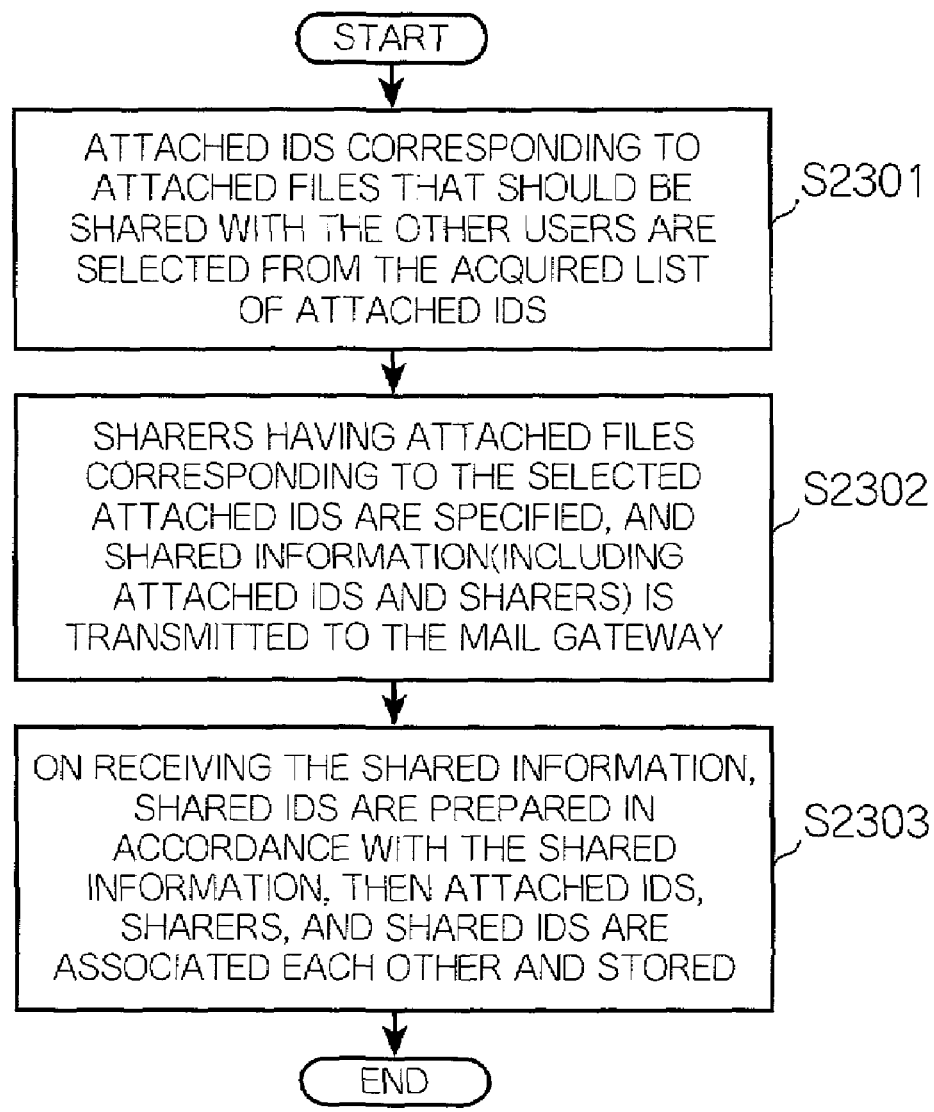
FIG. 23 is a flowchart showing a procedure for sharing the attached file belonging to a user of a mail terminal with the other users.

FIG. 23 is a flowchart showing a procedure for sharing the attached file belonging to a user of the mail terminal 180 with the other users.

[Procedure by the Mail Terminal 180]

The mail terminal 180 passes, to the shared notification unit 184, the attached IDs which are associated with the attached files that should be shared with the other users and which are selected from the list of attached IDs that the ID acquisition unit 181 acquires (Step S2301). Next, the mail terminal 180 receives the attached IDs from the ID acquisition unit 181, specifies sharers of the attached files corresponding to the attached IDs, and transmits shared information on the attached IDs and the sharers of the attached files corresponding to the attached IDs to the mail gateway 190 (Step S2302). Here, sharers can be specified only for the attached files that are owned by the user having the mail terminal 180.

[Procedure by the Mail Gateway 190]

Then, the mail gateway 190 receives the shared information from the mail terminal 180, generates and associates shared IDs from the shared information for each ID of the shared information, associates "attached IDs" and "sharers" with the "shared IDs", and stores them in the ID storing unit 191. Here, in a case where the shared IDs have been associated with attached IDs in the shared information, the shared ID management unit 194 adds the sharers of the shared information to the sharers corresponding to such shared IDs (Step S2303).

As described above, the shared IDs (which are associated with the shared attached files) are transmitted together with the attached IDs from the mail gateway 190 when the sharer of the attached IDs issue an ID acquisition request to the mail gateway 190. Then, the received shared IDs can be available among the sharers.

The following will describe the procedure for constructing the mail including the shared IDs transmitted from the mail terminal 180.

FIG. 24 is a flowchart showing a procedure for the mail gateway 190 to construct the mail including the shared ID sent from the mail terminal 180.

As shown in FIG. 24, the mail gateway 190 passes the received mail that is sent from the mail terminal 180 to the mail construction unit 193. The mail construction unit analyses whether or not the mail includes shared IDs (Step S2401).

As a result of the analysis, in a case where the mail does not include shared IDs, the mail gateway 190 passes the mail without being processed to the mail server 120 (Step S2405). In a case where the mail includes shared IDs, the mail gateway 190 extracts the shared IDs from the mail (Step S2402) and acquires the attached files corresponding to the extracted shared IDs from the mail server 120 (Step S2403). Then, the mail gateway 190 attaches the acquired attached files, as substitutes for the shared IDs, to the mail so as to construct the mail (Step S2404). Finally, the mail gateway 190 sends the constructed mail to the mail server 120 (Step S2405).

As stated above, according to the e-mail transmission/reception system of this embodiment, each attached file included in the received mail can be shared with the other users and shared IDs can be associated with the shared attached files, so that the associated shared IDs are available among the sharers. Therefore, attached files that belong to the other users also can be transmitted to receivers of the mail by preparing the mail including the shared IDs.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An e-mail transmission/reception system including a mail terminal, a mail server, and a mail gateway, wherein said mail gateway is connected to said mail terminal via a network and to said mail server via another network, wherein said mail server comprises:
   an attached file holding unit operable to receive a single e-mail addressed to a user of said mail terminal, the single e-mail including a plurality of attached files, and to hold the plurality of attached files included in the single e-mail; and
   a mail management unit operable to generate a list of the plurality of attached files included in the single e-mail;

wherein said mail gateway comprises:
   an attached file acquisition unit operable to receive from said mail terminal a request for transmitting unique identifiers to said mail terminal, each of the unique identifiers identifying a respective one of the plurality of attached files included in the single e-mail, and to receive from said mail server the list of the plurality of attached files included in the single e-mail in response to the request;
   an identifier generation unit operable to generate the unique identifiers identifying each of the plurality of attached files, based on the received list of the plurality of attached files included in the single e-mail;
   a list transmission unit operable to generate an identifier list of the unique identifiers generated by said identifier generation unit and to transmit the identifier list to said mail terminal;
   a reception unit operable to receive a forwarding e-mail from said mail terminal, the forwarding e-mail being forwarded from said mail terminal to another mail terminal, the forwarding e-mail including at least one of the unique identifiers, the at least one unique identifier being selected at said mail terminal, at least of one the plurality of attached files included in the single e-mail corresponding to the at least one unique identifier; and
a mail transmission and reception unit operable to transmit to said mail server a request for transmitting to said mail gateway the at least one attached file included in the single e-mail corresponding to the at least one unique identifier and to receive from said mail server the at least one attached file included in the single e-mail;

wherein said mail terminal comprises:
a list reception unit operable to receive the identifier list from said mail gateway;
a selection receiving unit operable to display the unique identifiers included in the received identifier list in a selectable manner;
a preparation unit operable to prepare the forwarding e-mail, the forwarding e-mail including the at least one unique identifier selected by the user of said mail terminal as a substitute for the at least one attached file included in the single e-mail corresponding to the at least one unique identifier; and
a transmission unit operable to transmit the prepared forwarding e-mail to said mail gateway;

wherein said attached file acquisition unit is operable to receive from said mail server the at least one attached file included in the single e-mail based on the at least one unique identifier included in the forwarding e-mail;

wherein said mail gateway further comprises:
a construction unit operable to construct a file attached forwarding e-mail by attaching the at least one attached file received from said mail server to the forwarding e-mail received from said mail terminal; and wherein said mail server further comprises:
a mail distribution unit operable to receive the file attached forwarding e-mail transmitted from said mail gateway and to distribute the file attached forwarding e-mail to the another mail terminal.

2. The e-mail transmission/reception system of claim 1, wherein:
said mail management unit is operable to, whenever said attached file holding unit receives an e-mail that includes attached files, generate the list of the plurality of attached files and pass the list of the plurality of attached files to said attached file acquisition unit; and
said identifier generation unit is operable to generate the unique identifier for each of the plurality of attached files, respectively, in accordance with the list of the plurality of attached files passed by said mail management unit.

3. The e-mail transmission/reception system of claim 1, wherein said mail terminal further comprises:
a file format registration unit operable to register one or more file formats of attached files for each user's address in said mail gateway;
wherein said mail gateway further comprises:
a file format storage unit operable to store users' addresses and file formats that are registered by said file format registration unit; and
a file format conversion unit operable to convert a file format of each attached file for each user's address in accordance with the users' addresses and the file formats that are stored in the said file format storage unit; and wherein said construction unit is operable to construct the file attached forwarding e-mail by attaching each attached file converted by said file format conversion unit from and as a substitute for each attached file received by said attached file acquisition unit, respectively.

4. The e-mail transmission/reception system of claim 1, wherein said mail terminal further comprises:
a sharing notification unit operable to notify said mail gateway that one or more attached files included in an e-mail addressed to the user of said mail terminal are to be shared with other users;
wherein said mail gateway further comprises:
an attached file sharing unit operable to, when receiving the notification that the one or more attached files are to be shared with the other users from said mail terminal, share each of the attached files held by said attached file holding unit with the other users; and
a shared identifier generation unit operable to generate a shared identifier for each of the attached files shared by said attached file sharing unit, the shared identifier being available for sharers of the attached files;
wherein said sharing notification unit includes:
a shared file notification unit operable to notify said mail gateway of one or more identifiers selected by the user from the identifier list as substitutes for the one or more attached files that are permitted to be shared; and
a sharer notification unit operable to notify said mail gateway of one or more sharers of each of the attached files that are to be shared with the other users;
wherein said attached file sharing unit is operable to share attached files that correspond to the identifiers notified from said shared file notification unit among attached files held by said attached file holding unit with the sharers notified from said sharer notification unit;
wherein said list transmission unit is further operable to transmit a list of the shared identifiers to the sharers of the attached files;
wherein said attached file acquisition unit is further operable to acquire attached files that correspond to the shared identifiers; and
wherein said list reception unit is further operable to receive a list of shared identifiers that have a one to one correspondence to each of the attached files that are shared by the user of said mail terminal as one member of the sharers.

5. An e-mail transmission/reception system including a mail terminal and a mail gateway, said mail gateway being connected to said mail terminal via a network,
wherein said mail gateway comprises:
an attached file holding unit operable to receive a single e-mail addressed to a user of said mail terminal, the single e-mail including a plurality of attached files and to hold the plurality of attached files included in the single e-mail;
a mail management unit operable to generate a list of the plurality of attached files included in the single e-mail;
an attached file acquisition unit operable to receive from said mail terminal a request for transmitting unique identifiers to said mail terminal each of the unique identifiers identifying a respective one of the plurality of attached files included in the single e-mail, and to acquire from said attached file holding unit the list of the plurality of attached files included in the single e-mail, in response to the request;
an identifier generation unit operable to generate the unique identifiers identifying each of the plurality of attached files, based on the acquired list of the plurality of attached files included in the single e-mail;

a list transmission unit operable to generate an identifier list of the unique identifiers generated by said identifier generation unit and to transmit the identifier list to said mail terminal; and a reception unit operable to receive a forwarding e-mail from said mail terminal, the forwarding e-mail being forwarded from said mail terminal to another mail terminal, the forwarding e-mail including at least one of the unique identifiers, the at least one unique identifier being selected at said mail terminal, at least one of the plurality of attached files included in the single e-mail corresponding to the at least one unique identifier; and wherein said mail terminal comprises:

a list reception unit operable to receive the identifier list from said mail gateway;

a selection receiving unit operable to display the unique identifiers in the received identifier list, in a selectable manner;

a preparation unit operable to prepare the forwarding e-mail, the forwarding e-mail including the at least one unique identifier selected by the user of said mail terminal as a substitute for the at least one attached file included in the single e-mail corresponding to the at least one unique identifier; and a transmission unit operable to transmit the forwarding e-mail prepared by said preparation unit to said mail gateway;

wherein said attached file acquisition unit is operable to acquire from said attached file holding unit the at least one attached file included in the single e-mail based on the at least one unique identifier included in the forwarding e-mail; and wherein said mail gateway further comprises:

a construction unit operable to construct a file attached forwarding e-mail by attaching the at least one attached file acquired from said attached file holding unit to the forwarding e-mail received from said mail terminal; and a mail distribution unit operable to distribute the file attached forwarding e-mail to the another mail terminal.

6. The e-mail transmission/reception system of claim 5, wherein:

said mail management unit is operable to, whenever said attached file holding unit receives an e-mail that includes attached files, generate the list of the plurality of attached files and pass the list of the plurality of attached files to said attached file acquisition unit; and said identifier generation unit is operable to generate the unique identifier for each of the attached files, respectively, in accordance with the list of the plurality of attached files passed by said mail management unit.

7. The e-mail transmission/reception system of claim 5, wherein said mail terminal further comprises:

a file format registration unit operable to register one or more file formats of attached files for each user's address in said mail gateway;

wherein said mail gateway further comprises:

a file format storage unit operable to store users' addresses and file formats that are registered by said file format registration unit; and a file format conversion unit operable to convert a file format of each attached file for each user's address in accordance with the users' addresses and the file formats that are stored in said file format storage unit; and wherein said construction unit is operable to construct the file attached forwarding e-mail by attaching each attached file converted by said file format conversion unit from and as a substitute for each attached file acquired by said attached file acquisition unit, respectively.

8. The e-mail transmission/reception system of claim 5, wherein said mail terminal further comprises:

a sharing notification unit operable to notify said mail gateway that one or more attached files included in the e-mail addressed to the user of said mail terminal are to be shared with other users;

wherein said mail gateway further comprises:

an attached file sharing unit operable to, when receiving the notification that the one or more attached files are to be shared with the other users from said mail terminal, share each of the attached files held by said attached file holding unit with the other users; and a shared identifier generation unit operable to generate a shared identifier for each of the attached files shared by said attached file sharing unit, the shared identifier being available for sharers of the attached files;

wherein said sharing notification unit includes:

a shared file notification unit operable to notify said mail gateway of one or more identifiers selected by the user from the identifier list as substitutes for the one or more attached files that are permitted to be shared; and a sharer notification unit operable to notify said mail gateway of one or more sharers of each of the attached files that are to be shared with the other users;

wherein said attached file sharing unit is operable to share attached files that correspond to the identifiers notified from said shared file notification unit among attached files held by said attached file holding unit with the sharers notified from said sharer notification unit;

wherein said list transmission unit is further operable to transmit a list of the shared identifiers to the sharers of the attached files;

wherein said attached file acquisition unit is further operable to acquire attached files that correspond to the shared identifiers; and wherein said list reception unit is further operable to receive a list of shared identifiers that have a one to one correspondence to each of the attached files that are shared by the user of said mail terminal as one member of the sharers.

9. A mail gateway that is connected to a mail terminal via a network and a mail server via another network, the mail server receiving a single e-mail addressed to a user of the mail terminal, the single e-mail including a plurality of attached files, holding the plurality of attached files included in the single e-mail, and generating a list of the plurality of attached files included in the single e-mail, said mail gateway comprising:

an attached file acquisition unit operable to receive from the mail terminal a request for transmitting unique identifiers to the mail terminal, each of the unique identifiers identifying a respective one of the plurality of attached files included in the single e-mail, and to receive from the mail server the list of the plurality of attached files included in the single e-mail, in response to the request;

an identifier generation unit operable to generate the unique identifiers identifying each of the plurality of attached files, based on the received list of the plurality of attached files included in the single e-mail;
a list transmission unit operable to generate an identifier list of the unique identifiers generated by said identifier generation unit and to transmit the identifier list to the mail terminal;
a reception unit operable to receive a forwarding e-mail transmitted from the mail terminal, the forwarding e-mail being forwarded from the mail terminal to another mail terminal, the forwarding e-mail including at least one of the unique identifiers, the at least one unique identifier being selected at the mail terminal, at least one of the plurality of attached files included in the single e-mail corresponding to the at least one unique identifier; and
a mail transmission and reception unit operable to transmit to the mail server a request for transmitting to said mail gateway the at least one attached file included in the single e-mail corresponding to the at least one unique identifier and to receive from the mail server the at least one attached file included in the single e-mail;
wherein the mail terminal comprises:
a list reception unit operable to receive the identifier list from said mail gateway;
a selection receiving unit operable to display the unique identifiers in the received identifier list, in a selectable manner;
a preparation unit operable to prepare the forwarding e-mail, the forwarding e-mail including the at least one unique identifier selected by the user of the mail terminal as a substitute for the at least one attached file included in the single e-mail corresponding to the at least one unique identifier: and
a transmission unit operable to transmit the forwarding e-mail prepared by the preparation unit to said mail gateway;
wherein said attached file acquisition unit is operable to receive from the mail server the at least one attached file included in the single e-mail based on the at least one unique identifier included in the forwarding e-mail; and
wherein said mail gateway further comprises:
a construction unit operable to construct a file attached forwarding e-mail by attaching the at least one attached file received from the mail server to the forwarding e-mail received from the mail terminal; and
wherein the mail server further comprises:
a mail distribution unit operable to receive the file attached forwarding e-mail transmitted from said mail gateway and to distribute the file attached forwarding e-mail to the another mail terminal.

10. The mail gateway of claim 9, wherein:
the mail server functions, whenever receiving an e-mail that includes attached files, so as to generate the list of the plurality of attached files and pass the list of the plurality of attached files to said mail gateway; and
said identifier generation unit is operable to generate the unique identifier for each of the attached files, respectively, in accordance with the list of the plurality of attached files passed by the mail server.

11. The mail gateway of claim 9, further comprising:
a file format storage unit operable to store users' addresses and file formats that are registered by the mail terminal; and
a file format conversion unit operable to convert one or more file formats of attached files for each user's address in accordance with the users' addresses and the file formats that are stored in said file format storage unit;
wherein the mail terminal functions so as to register the one or more file formats of attached files for each user's address in said mail gateway; and
wherein said construction unit is operable to construct the file attached forwarding e-mail by attaching each attached file converted by said file format conversion unit from and as a substitute for each attached file acquired by said attached file acquisition unit, respectively.

12. The mail gateway of claim 9, further comprising:
an attached file sharing unit operable to, when receiving a notification that attached files are to be shared with other users from the mail terminal, share each of the attached files held by the mail server with the other users;
a shared identifier generation unit operable to generate a shared identifier for each of the attached files shared by said attached file sharing unit, the shared identifier being available for sharers of the attached files;
wherein the mail terminal functions so as to notify said mail gateway that one or more attached files are to be shared with other users by means of identifiers respectively corresponding to the one or more attached files, the attached files being included in an e-mail addressed to the user of the mail terminal and being permitted to be shared with other users, and notify said mail gateway of the one or more sharers who are to share the one or more attached files;
wherein said attached file sharing unit is operable to share the one or more attached files that correspond to the one or more identifiers notified from the mail terminal out of attached files held by the mail server among the notified sharers;
wherein said list transmission unit is further operable to transmit a list of the shared identifiers to the sharers of the attached files; and
wherein said attached file acquisition unit is further operable to acquire attached files that correspond to the shared identifiers.

13. A mail gateway that is connected to a mail terminal via a network, said mail gateway comprising:
an attached file holding unit operable to receive a single e-mail addressed to a user of the mail terminal, the single e-mail including a plurality of attached files, and to hold the plurality of attached files included in the single e-mail;
a mail management unit operable to generate a list of the plurality of attached files included in the single e-mail;
an attached file acquisition unit operable to receive from the mail terminal a request for transmitting unique identifiers to the mail terminal, each of the unique identifiers identifying a respective one of the plurality of attached files included in the single e-mail, and to acquire from said attached file holding unit the list of the plurality of attached files included in the single e-mail, in response to the request;
an identifier generation unit operable to generate the unique identifiers identifying each of the plurality of attached files, based on the acquired list of the plurality of attached files included in the single e-mail;
a list transmission unit operable to generate an identifier list of the unique identifiers generated by said identifier generation unit and to transmit the identifier list to the mail terminal;
a reception unit operable to receive a forwarding e-mail from the mail terminal, the forwarding e-mail being forwarded from the mail terminal to another mail terminal, the forwarding e-mail including at least one of the unique, identifiers, the at least one unique identifier being selected at the mail terminal, at least one of the plurality of attached files included in the single e-mail corresponding to the at least one unique identifier;

wherein the mail terminal comprises:

a list reception unit operable to receive the identifier list from said mail gateway;

a selection receiving unit operable to display the unique identifiers included in the received identifier list in a selectable manner;

a preparation unit operable to prepare the forwarding e-mail, the forwarding e-mail including the at least one unique identifier selected by the user of the mail terminal as a substitute for the at least one attached file included in the single e-mail corresponding to the at least one unique identifier; and a transmission unit operable to transmit the prepared forwarding e-mail to said mail gateway;

wherein said attached file acquisition unit is operable to acquire from said attached file holding unit the at least one attached file included in the single e-mail based on the at least one unique identifier included in the forwarding e-mail;

wherein said mail gateway further comprises:

a construction unit operable to construct a file attached forwarding e-mail by attaching the at least one attached file acquired from said attached file holding unit to the forwarding e-mail received from the mail terminal; and a mail distribution unit operable to distribute the file attached forwarding e-mail to the another mail terminal.

14. The mail gateway of claim 13, wherein:

said mail management unit is operable to, whenever said attached file holding unit receives an e-mail that includes attached files, generate the list of the plurality of attached files and pass the list of the plurality of attached files to said identifier generation unit; and said identifier generation unit is operable to generate the unique identifier for each of the attached files, respectively, in accordance with the list of the plurality of attached files passed by said mail management unit.

15. The mail gateway of claim 13, further comprising:

a file format storage unit operable to store users' addresses and file formats that are registered by the mail terminal; and a file format conversion unit operable to convert one or more file formats of attached files for each user's address in accordance with the users' addresses and the file formats that are stored in said file format storage unit, wherein the mail terminal functions so as to register the one or more file formats of attached files for each users' address in said mail gateway, and said construction unit is operable to construct the file attached forwarding e-mail by attaching each attached file converted by said file format conversion unit from and as a substitute for each attached file acquired by said attached file acquisition unit, respectively.

16. The mail gateway of claim 13, further comprising:

an attached file sharing unit operable to, when receiving a notification that attached files are to be shared with other users from the mail terminal, share each of the attached files held by said attached file holding unit with the other users; and a shared identifier generation unit operable to generate a shared identifier for each of the attached files shared by said attached file sharing unit, wherein the shared identifier is available for sharers of the attached files;

wherein the mail terminal functions so as to notify said mail gateway that one or more attached files are to be shared with other users by means of identifiers respectively corresponding to the one or more attached files, the attached files being included in an e-mail addressed to the user of the mail terminal and being permitted to be shared with the other users, and notify said mail gateway of one or more sharers who share the one or more attached files;

wherein said attached file sharing unit is operable to share the one or more attached files that correspond to the one or more identifiers notified from the mail terminal out of attached files held by the mail server among the notified sharers;

wherein said list transmission unit is further operable to transmit a list of the shared identifiers to the sharers of the attached files; and wherein said attached file acquisition unit is further operable to acquire attached files that correspond to the shared identifiers.

17. A mail terminal that is connected to a mail gateway via a network, the mail gateway being connected to a mail server via another network, the mail server receiving a single e-mail addressed to a user of said mail terminal, the single e-mail including a plurality of attached files, the mail server holding the plurality of attached files included in the single e-mail and generating a list of the plurality of attached files included in the single e-mail, the mail gateway receiving from said mail terminal a request for transmitting unique identifiers to said mail terminal, each of the unique identifiers identifying a respective one of the plurality of attached files included in the single e-mail, and the mail gateway receiving from said mail server the list of the plurality of attached files included in the single e-mail, in response to the request, the mail gateway generating the unique identifiers identifying each of the plurality of attached files, based on the received list of the plurality of attached files included in the single e-mail, the gateway generating an identifier list of the unique identifiers generated by the mail server and transmitting the identifier list to said mail terminal, the mail gateway receiving a forwarding e-mail from said mail terminal, the forwarding e-mail being forwarded from said mail terminal to another mail terminal, the forwarding e-mail including at least one of the unique identifiers, the at least one of the unique identifiers being selected at the mail terminal, the mail gateway transmitting to the mail server a request for transmitting to the mail gateway at least one of the plurality of attached files included in the single e-mail corresponding to the at least one unique identifiers and receiving from the mail server the at least one attached file included in the single e-mail, said mail terminal comprising:

a list reception unit operable to receive the identifier list from the mail gateway for each of the plurality of attached files included in the e-mail;

a selection receiving unit operable to display the unique identifiers included in the received identifier list in a selectable manner;

a preparation unit operable to prepare the forwarding e-mail, the forwarding e-mail including the at least one unique identifier selected by the user of said mail terminal as a substitute for the at least one attached file included in the single e-mail corresponding to the at least one unique identifier; and a transmission unit operable to transmit the forwarding e-mail prepared by said preparation unit to the mail gateway;

wherein the mail gateway is operable to receive from the mail server the at least one attached file included in the single e-mail based on the at least one unique identifier included in the forwarding e-mail; and wherein the mail gateway comprises:

a construction unit operable to construct a file attached forwarding e-mail by attaching the at least one attached file received from the mail server to the forwarding e-mail received from said mail terminal; and wherein the mail server comprises:

a mail distribution unit operable to receive the file attached forwarding e-mail transmitted from the mail gateway and to distribute the file attached forwarding e-mail to the another mail terminal.

18. The mail terminal of claim 17, further comprising:

a file format registration unit operable to register one or more file formats of attached files for each user's address in the mail gateway;

wherein the mail gateway functions so as to store users' addresses and file formats that are registered by said mail terminal, and convert file formats of attached files for each user's address in accordance with the stored users' addresses and file formats.

19. The mail terminal of claim 17, further comprising:

a sharing notification unit operable to notify the mail gateway that one or more attached files included in an e-mail addressed to the user of said mail terminal are to be shared with other users;

wherein said sharing notification unit includes:

a shared file notification unit operable to notify the mail gateway of one or more identifiers selected by the user from the identifier list as substitutes for the one or more attached files that are permitted to be shared; and a sharer notification unit operable to notify the mail gateway of one or more sharers of each of the attached files that are permitted to be shared with the other users; and wherein the mail gateway functions so as to share attached files respectively corresponding to the identifiers notified from said shared file notification unit among the sharers notified from said sharer notification unit and generate a shared identifier for each of the shared attached files, the shared identifier being available for the sharers.

20. A method for controlling an e-mail transmission/reception system including a mail terminal, a mail server, and a mail gateway, the mail gateway being connected to the mail terminal via a network and to the mail server via another network, said method comprising:

receiving, in the mail server, a single e-mail addressed to a user of the mail terminal, the single e-mail including a plurality of attached files, and holding the plurality of attached files included in the single e-mail in the mail server;

generating, in the mail server, a list of the plurality of attached files included in the single e-mail;

receiving, in the mail gateway from the mail terminal, a request for transmitting unique identifiers to the mail terminal, each of the unique identifiers identifying a respective one of the plurality of attached files included in the single e-mail, and receiving, in the mail gateway from the mail server, the list of the plurality of attached files included in the single e-mail, in response to the request;

generating, in the mail gateway, the unique identifiers identifying each of the plurality of attached files, based on the received list of the plurality of attached files included in the single e-mail;

generating, in the mail gateway, an identifier list of the unique identifiers generated in said generating of the unique identifiers for each of the attached files, and transmitting the identifier list from the mail gateway to the mail terminal;

receiving, in the mail terminal, the identifier list from the mail gateway;

displaying, in the mail terminal, the unique identifiers included in the received identifier list in a selectable manner;

preparing, in the mail terminal, a forwarding e-mail, the forwarding e-mail being forwarded from the mail terminal to another mail terminal, the forwarding e-mail including at least one of the unique identifiers, the at least one unique identifier being selected in said displaying of the unique identifiers at the mail terminal, the forwarding e-mail including the at least one unique identifier selected by the user of the mail terminal as a substitute for the at least one attached file included in the single e-mail corresponding to the at least one unique identifier;

transmitting the forwarding e-mail prepared in said preparing of the forwarding e-mail from the mail terminal to the mail gateway;

receiving, in the mail gateway from the mail terminal, the forwarding e-mail transmitted in said transmitting of the forwarding e-mail;

acquiring, in the mail gateway from the mail server, the at least one of the plurality of attached files included in the single e-mail based on the at least one unique identifier included in the forwarding e-mail, the at least one attached file included in the single e-mail corresponding to the at least one unique identifier;

constructing, in the mail gateway, a file attached forwarding e-mail by attaching the at least one attached files acquired in said acquiring of the at least one attached file to the forwarding e-mail received in said receiving of the forwarding e-mail; and receiving, in the mail server from the gateway, the file attached forwarding e-mail and distributing the file attached forwarding e-mail from the mail server to the another mail terminal.

21. A method for controlling an e-mail transmission/reception system including a mail terminal and a mail gateway, the mail gateway being connected to the mail terminal via a network, said method comprising:

receiving, in the mail gateway, single e-mail addressed to a user of the mail terminal, the single e-mail including a plurality of attached files, and holding the plurality of attached files included in the single e-mail in the mail gateway;

generating, in the mail gateway, a list of the plurality of attached files included in the single e-mail;

receiving for the mail terminal a request for transmitting unique identifiers to the mail terminal, each of the unique identifiers identifying a respective one of the plurality of attached files included in the single e-mail, and acquiring the list of the plurality of attached files included in the single e-mail, in response to the request;

generating, in the mail gateway, the unique identifiers identifying each of the plurality of attached files, based on the received list of the plurality of attached files included in the single e-mail;

generating, in the mail gateway, an identifier list of the unique identifiers generated in said generating of the unique identifiers for each of the attached files, and transmitting the identifier list from the mail gateway to the mail terminal;

receiving, in the mail terminal, the identifier list generated in said generating of the identifier list from the mail gateway;

displaying, in the mail terminal, the unique identifiers in the received identifier list, in a selectable manner;

preparing, in the mail terminal, a forwarding e-mail, the forwarding e-mail being forward from the mail terminal to another mail terminal, the forwarding e-mail including at least one of the unique identifiers, the at least one unique identifier being selected at the mail terminal, the forwarding e-mail including the at least one unique identifier selected by the user of the mail terminal as a substitute for the at least one attached file included in the single e-mail corresponding the at least one unique identifier;

transmitting the forwarding e-mail prepared in said preparing of the forwarding e-mail from the mail terminal to the mail gateway;

receiving, in the mail gateway, the forwarding e-mail transmitted from the mail terminal to the mail gateway in said transmitting of the forwarding e-mail;

acquiring, in the mail gateway, the at least one attached files included in the single e-mail, based on the at least one unique identifier included in the forwarding e-mail, the at least one attached file included in the single e-mail corresponding to the at least one unique identifier;

constructing, in the mail gateway, a file attached forwarding e-mail by attaching the at least one attached file acquired in said acquiring of the at least one attached file to the forwarding e-mail received from the mail terminal; and distributing the file attached forwarding e-mail constructed in said constructing of the file attached forwarding e-mail to the another mail terminal.

22. A method for controlling a mail gateway that is connected to a mail terminal via a network and to a mail server via another network, the mail server receiving a single e-mail addressed to the user of the mail terminal, the single e-mail including a plurality of attached files, holding the plurality of attached files included in the received single e-mail, and generating a list of the plurality of attached files included in the single e-mail, said method comprising:

receiving, in the mail gateway from the mail terminal, a request for transmitting unique identifiers to the mail terminal, each of the unique identifiers identifying a respective one of the plurality of attached files included in the single e-mail, and receiving in the mail gateway from the mail server, the list of the plurality of attached files included in the single e-mail, in response to the request;

generating the unique identifiers identifying each of the plurality of attached files, based on the received list of the plurality of attached files included in the single e-mail;

generating an identifier list of the unique identifiers generated in said generating of the unique identifiers, and transmitting the identifier list to the mail terminal;

receiving a forwarding e-mail transmitted from the mail terminal, the forwarding e-mail being forwarded from the mail terminal to another mail terminal, the forwarding e-mail including at least one of the unique identifiers, the at least one unique identifier being selected at the mail terminal;

transmitting, in the mail gateway to the mail server, a request for transmitting to the mail gateway at least one of the plurality of attached files included in the single e-mail corresponding to the at least one unique identifier;

acquiring, in the mail gateway from the mail server, the at least one attached file included in the single e-mail based on the at least one unique identifier included in the forwarding e-mail, the at least one attached file included in the single e-mail corresponding to the at least one unique identifier;

constructing a file attached forwarding e-mail by attaching the at least one attached file acquired in said acquiring of the at least one attached file to the forwarding e-mail received in said receiving of the forwarding e-mail;

transmitting the forwarding e-mail constructed in said constructing of the file attached forwarding e-mail to the mail server;

receiving, in the mail terminal, the identifier list from the mail gateway, displaying the unique identifiers included in the received identifier list in a selectable manner, preparing the forwarding e-mail, the forwarding e-mail including the at least one unique identifier selected by the user of the mail terminal as a substitute for the at least one attached files included in the single e-mail corresponding to the at least one unique identifier, and transmitting the prepared forwarding e-mail to the mail gateway; and receiving, in the mail server, the file attached forwarding e-mail transmitted from the mail gateway and distributing the file attached forwarding e-mail to the another mail terminal.

23. A method for controlling a mail gateway that is connected to a mail terminal via a network, said method comprising:

receiving, in the mail gateway, a single e-mail addressed to a user of the mail terminal, the single e-mail including a plurality of attached files, and holding the plurality of attached files included in the single e-mail generating a list of the plurality of attached files included in the single e-mail;

receiving, in the mail gateway from the mail terminal, a request for transmitting unique identifiers to the mail terminal, each of the unique identifiers identifying a respective one of the plurality of attached files included in the single e-mail, and acquiring the list of the plurality of attached files included in the single e-mail, in response to the request;

generating the unique identifiers identifying each of the plurality of attached files, based on the acquired list of the plurality of attached files included in the single e-mail;

generating an identifier list of the unique identifiers generated in said generating of the unique identifiers for each of the plurality of attached files, and transmitting the identifier list to the mail terminal;

receiving a forwarding e-mail from the mail terminal, the forwarding e-mail being forwarded from the mail terminal to another mail terminal, the forwarding e-mail including at least one of the unique identifiers, the at least one unique identifier being selected at the mail terminal;

acquiring the at least one attached file included in the single e-mail, based on the at least one unique identifier included in the forwarding e-mail, the at least one attached file included in the single e-mail corresponding to the at least one unique identifier;

constructing a file attached forwarding e-mail by attaching the at least one attached file acquired in said acquiring of the at least one attached file to the forwarding e-mail received in said receiving of the forwarding e-mail;

distributing the file attached forwarding e-mail constructed in said constructing of the file attached forwarding e-mail to the another mail terminal; and receiving, in the mail terminal, the identifier list from the mail gateway, displaying the unique identifiers included in the received identifier list in a selectable manner, preparing the forwarding e-mail, the forwarding e-mail including the at least one unique identifier selected by the user of the mail terminal as a substitute for the at least one attached file included in the single e-mail corresponding to the at least one unique identifier, and transmitting the prepared forwarding e-mail to the mail gateway.

24. A method for controlling a mail terminal that is connected to a mail gateway via a network, the mail gateway being connected to a mail server via another network, the mail server receiving a single e-mail addressed to a user of the mail terminal, a plurality of attached files being included in the single e-mail, the mail server holding the plurality of attached files included in the single e-mail and generating a list of the plurality of attached files included in the single e-mail, the mail gateway receiving from the mail terminal a request for transmitting unique identifiers to the mail terminal, each of the unique identifiers identifying a respective one of the plurality of attached files included in the single e-mail, and the mail gateway receiving from the mail server the list of the plurality of attached files included in the single e-mail, in response to the request, the mail gateway generating the unique identifiers identifying each of the plurality of attached files, based on the received list of the plurality of attached files included in the single e-mail, the mail gateway generating an identifier list of the unique identifiers generated by the mail gateway and transmitting the identifier list to the mail terminal, the mail gateway receiving a forwarding e-mail from the mail terminal, the forwarding e-mail being forwarded from the mail terminal to another mail terminal, the forwarding e-mail including at least one of the unique identifiers, the at least one unique identifier being selected at the mail terminal, the mail gateway transmitting to the mail server a request for transmitting to the mail gateway at least one of the plurality of attached files included in the single e-mail corresponding to the at least one unique identifier and receiving from the mail server the at least one attached file included in the single e-mail, said method comprising:

receiving the identifier list from the mail gateway for each of the plurality of attached files included in the e-mail;

displaying the unique identifiers included in the received identifier list, in a selectable manner;

preparing the forwarding e-mail, the forwarding e-mail including the at least one unique identifier selected by the user of the mail terminal as a substitute for the at least one attached file included in the single e-mail corresponding to the at least one unique identifier;

transmitting the forwarding e-mail prepared in said preparing of the forwarding e-mail to the mail gateway;

receiving, in the mail gateway from the mail server, the at least one attached file included in the single e-mail based on the at least one unique identifier included in the forwarding e-mail, constructing a file attached forwarding e-mail by attaching the at least one attached file received from the mail server to the forwarding e-mail received from the mail terminal; and receiving, in the mail server, the file attached forwarding e-mail transmitted from the mail gateway and distributing the file attached forwarding e-mail to the another mail terminal.

25. A recording medium which is readable by a computer connected to a mail terminal via a network and to a mail server via another network, the mail server receiving a single e-mail addressed a user of the mail terminal, the single e-mail including a plurality of attached files, holding the plurality of attached files included in the received single e-mail, and generating a list of the plurality of attached files included in the single e-mail, a computer program embodied on said recording medium causing the computer to conduct operations a method comprising:

receiving, in the mail gateway from the mail terminal, a request for transmitting unique identifiers to the mail terminal, each of the unique identifiers identifying a respective one of the plurality of attached files included in the single e-mail, and receiving, in the mail gateway from the mail server, the list of the plurality of attached files included in the single e-mail, in response to the request;

generating the unique identifiers identifying each of the plurality of attached files, based on the received list of the plurality of attached files included in the single e-mail;

generating an identifier list of the identifiers generated in said generating of the unique identifiers, and transmitting the identifier list to the mail terminal;

receiving a forwarding e-mail transmitted from the mail terminal, the forwarding e-mail being forwarded from the mail terminal to another mail terminal, the forwarding e-mail including at least one of the unique identifiers, the at least one unique identifier being selected at the mail terminal;

transmitting, in the mail gateway to the mail server, a request for transmitting to the mail gateway at least one of the plurality of attached files included in the single e-mail corresponding to the at least one unique identifier;

acquiring, in the mail gateway from the mail server the at least one attached file included in the single e-mail based on the at least one unique identifier included in the forwarding e-mail, the at least on attached file included in the single e-mail corresponding to the at least one unique identifier;

constructing a file attached forwarding e-mail by attaching the at least one attached file acquired in said acquiring of the at least one attached file to the forwarding e-mail received in said receiving of the forwarding e-mail;

transmitting the file attached forwarding e-mail constructed in said constructing of the file attached forwarding e-mail to the mail server;

receiving, in the mail terminal, the identifier list from the mail gateway, displaying the unique identifiers included in the received identifier list in a selectable manner, preparing the forwarding e-mail, the forwarding e-mail including the at least one unique identifier selected by the user of the mail terminal as a substitute for the at least one attached file included in the single e-mail corresponding to the at least one unique identifier, and transmitting the prepared forwarding e-mail to the mail gateway; and receiving, in the mail server, the file attached forwarding e-mail transmitted from the mail gateway and distributing the file attached forwarding e-mail to the another mail terminal.

26. A recording medium which is readable by a computer that is connected to a mail terminal via a network, a computer program embodied on said recording medium causing the computer to conduct a method comprising:

receiving, in the mail gateway, a single e-mail addressed to a user of the mail terminal, the single e-mail including a plurality of attached files, and holding the plurality of attached files included in the single e-mail;

generating a list of the plurality of attached files included in the single e-mail;

receiving, in the mail gateway from the mail terminal, a request for transmitting unique identifiers to the mail terminal, each of the unique identifiers identifying a respective one of the plurality of attached files included in the single e-mail, and acquiring the list of the plurality of attached files included in the single e-mail, in response to the request;

generating the unique identifiers identifying each of the plurality of attached files, based on the acquired list of the plurality of attached files included in the single e-mail;

generating the identifier list of the unique identifiers generated in said generating of the unique identifiers for each of the plurality of attached files, and transmitting the identifier list to the mail terminal;

receiving a forwarding e-mail from the mail terminal, the forwarding e-mail being forwarded from the mail terminal to another mail terminal, the forwarding e-mail including at least one of the unique identifiers, the at least one unique identifier being selected at the mail terminal;

acquiring the at least one attached file included in the single e-mail, based on the at least one unique identifier included in the forwarding e-mail, the at least one attached file included in the single e-mail corresponding to the at least one unique identifier;

constructing a file attached forwarding e-mail by attaching the at least one attached file acquired in said acquiring of the at least one attached file to the forwarding e-mail received in said receiving of the forwarding e-mail;

distributing the forwarding e-mail constructed in said constructing of the forwarding e-mail to the other mail terminal; and receiving, in the mail terminal, the identifier list from the mail gateway, displaying the unique identifiers included in the received identifier list in a selectable manner, preparing the forwarding e-mail, the forwarding e-mail including the at least one unique identifier selected by the user of the mail terminal as a substitute for the at least one attached file included in the single e-mail corresponding to the at least one unique identifier, and transmitting the prepared forwarding e-mail to the mail gateway.

27. A recording medium which is readable by a computer that is connected to a mail gateway via a network, the mail gateway being connected to a mail server via another network, the mail server receiving a single e-mail addressed to a user of the mail terminal, the single e-mail including a plurality of attached files, the mail server holding the plurality of attached files included in the single e-mail and generating a list of the plurality of attached files included in the single e-mail, the mail gateway receiving from the mail terminal a request for transmitting unique identifiers to the mail terminal, each of the unique identifiers identifying a respective one of the plurality of attached files included in the single e-mail, and the mail gateway receiving from the mail server the list of the plurality of attached files included in the single e-mail, in response to the request, the mail gateway generating the unique identifiers identifying each of the plurality of attached files, based on the received list of the plurality of attached files included in the single e-mail, the mail gateway generating an identifier list of the unique identifiers generated by the mail gateway and transmitting the identifier list to the mail terminal, the mail gateway receiving a forwarding e-mail from the mail terminal, the forwarding e-mail being forwarded from the mail terminal to another mail terminal, the forwarding e-mail including at least one of the unique identifiers, the at least one unique identifier being selected at the mail terminal, the mail gateway transmitting to the mail server a request for transmitting to the mail gateway at least one of the plurality of attached files included in the single e-mail corresponding to the at least one unique identifier and receiving from the mail server the at least one attached file included in the single e-mail, a computer program embodied on said recording medium causing the computer to conduct a method comprising:

receiving the identifier list from the mail gateway for each of the plurality of attached files included in the e-mail;

displaying the unique identifiers included in the received identifier list, in a selectable manner;

preparing the forwarding e-mail, the forwarding e-mail including the at least one unique identifier selected by the user of the mail terminal as a substitute for the at least one attached file included in the single e-mail corresponding to the at least one unique identifier;

transmitting the forwarding e-mail prepared in said preparing of the forwarding e-mail to the mail gateway;

receiving, in the mail gateway from the mail server, the at least one attached file included in the single e-mail based on the at least one unique identifier included in the forwarding e-mail, constructing a file attached forwarding e-mail by attaching the at least one attached file received from the mail server to the forwarding e-mail received from the mail terminal; and receiving, in the mail server, the file attached forwarding e-mail transmitted from the mail gateway and distributing the file attached forwarding e-mail to the another mail terminal.

28. A program embodied on a computer-readable medium of a computer connected to a mail terminal via a network and to a mail server via another network, the mail server receiving a single e-mail addressed to the a of the mail terminal, the single e-mail including a plurality of attached files, holding the plurality of attached files included in the received single e-mail, and generating a list of the plurality of attached files included in the single e-mail, said program causing the computer to conduct a method comprising:

receiving, in the mail gateway from the mail terminal, a request for transmitting unique identifiers to the mail terminal, each of the unique identifiers identifying a respective one of the plurality of attached files included in the single e-mail, and receiving, in the mail gateway from the mail server, the list of the plurality of attached files included in the single e-mail, in response to the request;

generating the unique identifiers identifying each of the plurality of attached files, based on the received list of the plurality of attached files included in the single e-mail;

generating an identifier list of the unique identifiers generated in said generating of the unique identifiers, and transmitting the identifier list to the mail terminal;

receiving a forwarding e-mail transmitted from the mail terminal, the forwarding e-mail being forwarded from the mail terminal to another mail terminal, the forwarding e-mail including at least one of the unique identifiers, the at least one unique identifier being selected at the mail terminal;

transmitting, in the mail gateway to the mail server, a request for transmitting to the mail gateway at least one of the plurality of attached files included in the single e-mail corresponding to the at least one unique identifier;

acquiring, in the mail gateway from the mail server, the at least one attached file included in the single e-mail based on the at least one unique identifier included in the forwarding e-mail, the at least one attached file included in the single e-mail corresponding to the at least on unique identifier;

constructing a file attached forwarding e-mail by attaching the at least one attached file acquired in said acquiring of the at least one attached file to the forwarding e-mail received in said receiving of the forwarding e-mail;

transmitting the forwarding e-mail constructed in said constructing of the file attached e-mail to the mail server;

receiving, in the mail terminal, the identifier list from the mail gateway, displaying the unique identifiers included in the received identifier list in a selectable manner, preparing the forwarding e-mail, the forwarding e-mail including the at least one unique identifier selected by the user of the mail terminal as a substitute for the at least one attached file included in the single e-mail corresponding to the at least one unique identifier, and transmitting the prepared forwarding e-mail to the mail gateway; and receiving, in the mail server, the file attached forwarding e-mail transmitted from the mail gateway and distributing the file attached forwarding e-mail to the another mail terminal.

29. A program embodied on a computer-readable medium of a computer that is connected to a mail terminal via a network, said program causing the computer to conduct a method comprising:

receiving, in a mail gateway, a single e-mail addressed to a user of the mail terminal, the single e-mail including a plurality of attached files, and holding the plurality of attached files included in the single e-mail;

generating a list of the plurality of attached files included in the single e-mail;

receiving, in the mail gateway from the mail terminal, a request for transmitting unique identifiers to the mail terminal, each of the unique identifiers identifying a respective one of the plurality of attached files included in the single e-mail, and acquiring the list of the plurality of attached files included in the single e-mail, in response to the request;

generating the unique identifiers identifying each of the plurality of attached files, based on the acquired list of the plurality of attached files included in the single e-mail;

generating the identifier list of the unique identifiers generated in said generating of the unique identifiers for each of the plurality of attached files, and transmitting the identifier list to the mail terminal;

receiving a forwarding e-mail from the mail terminal, the forwarding e-mail being forwarded from the mail terminal to another mail terminal, the forwarding e-mail including at least one of the unique identifiers, the at least one unique identifier being selected at the mail terminal;

acquiring the at least one attached file included in the single e-mail based on the at least one unique identifier included in the forwarding e-mail, the at least on attached file included in the single e-mail corresponding to the at least one unique identifier;

constructing a file attached forwarding e-mail by attaching the at least one attached file acquired in said acquiring of the at least one attached file to the forwarding e-mail received in said receiving of the forwarding e-mail;

distributing the file attached forwarding e-mail constructed in said constructing of the file attached forwarding e-mail to the another e-mail terminal;

receiving, in the mail terminal, the identifier list from the mail gateway, displaying the unique identifiers included in the received identifier list in a selectable manner, preparing the forwarding e-mail, the forwarding e-mail including the at least one unique identifier selected by the user of the mail terminal as a substitute for the at least one attached file included in the single e-mail corresponding to the at least one unique identifier, and transmitting the prepared forwarding e-mail to the mail gateway.

30. A program embodied on a computer-readable medium of a computer that is connected to a mail gateway via a network, the mail gateway being connected to a mail server via another network, the mail server receiving a single e-mail addressed to a user of the mail terminal, a plurality of attached files being included in the single e-mail, the mail server holding the plurality of attached files included in the single e-mail and generating a list of the plurality of attached files included in the single e-mail, the mail gateway receiving from the mail terminal a request for transmitting unique identifiers to the mail terminal, each of the unique identifiers identifying a respective one of the plurality of attached files included in the single e-mail, and the mail gateway receiving from the mail server the list of the plurality of attached files included in the single e-mail, in response to the request, the mail gateway generating the unique identifiers identifying each of the plurality of attached files, based on the received list of the plurality of attached files included in the single e-mail, the mail gateway generating an identifier list of the unique identifiers generated by the mail gateway and transmitting the identifier list to the mail terminal, the mail gateway receiving a forwarding e-mail from the mail terminal, the forwarding e-mail being forwarded from the mail terminal to another mail terminal, the forwarding e-mail including at least one of the unique identifiers, the at least one unique identifier being selected at the mail terminal, the mail gateway transmitting to the mail server a request for transmitting to the mail gateway at least one of the plurality of attached files included in the single e-mail corresponding to the at least one unique identifier and receiving from the mail server the at least one attached file included in the single e-mail, said program causing the computer to conduct a method comprising:

receiving the identifier list from the mail gateway for each of the plurality of attached files included in the e-mail;

displaying the unique identifiers included in the received identifier list, in a selectable manner;

preparing the forwarding e-mail, the forwarding e-mail including the at least one unique identifier selected by the user of the mail terminal as a substitute for the at least one attached file included in the single e-mail corresponding to the at least one unique identifier;

transmitting the forwarding e-mail prepared in said preparing of the forwarding e-mail to the mail gateway;

receiving, in the mail gateway from the mail server, the at least one attached file included in the single e-mail based on the at least one unique identifier included in the forwarding e-mail, constructing a file attached forwarding e-mail by attaching the at least one attached file received from the mail server to the forwarding e-mail received from the mail terminal; and receiving, in the mail server, the file attached forwarding e-mail transmitted from the mail gateway and distributing the file attached forwarding e-mail to the another mail terminal.

* * * * *

UNITED STATES PATENT AND TRADEMARK OFFICE
CERTIFICATE OF CORRECTION

PATENT NO. : 7,664,824 B2
APPLICATION NO. : 09/910853
DATED : February 16, 2010
INVENTOR(S) : Susumu Kobayashi et al.

It is certified that error appears in the above-identified patent and that said Letters Patent is hereby corrected as shown below:

Title Page

Item (56) References Cited, under the "OTHER PUBLICATIONS" heading, please insert the following reference:

--ASTEL'S HOME PAGE, before July 24, 2000--.

In the Claims

In column 24, claim 5, line 60, "terminal" should read --terminal,--.

In column 27, claim 9, line 33, "identifier:" should read --identifier;--.

In column 32, claim 20, line 55, "single e-mail" should read --a single e-mail--.

In column 33, claim 22, line 57, "receiving" should read --receiving,--.

In column 36, claim 25, line 15, "addressed a" should read --addressed to a--.

In column 36, claim 25, lines 20-21, "conduct operations a" should read --conduct a--.

In column 36, claim 25, line 48, "mail server" should read --mail server,--.

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,664,824 B2
APPLICATION NO. : 09/910853
DATED : February 16, 2010
INVENTOR(S) : Susumu Kobayashi et al.

It is certified that error appears in the above-identified patent and that said Letters Patent is hereby corrected as shown below:

In the Claims

In column 22, claim 1, line 52, "e-mail" should read --e-mail,--.

Signed and Sealed this

Twenty-first Day of December, 2010

David J. Kappos
*Director of the United States Patent and Trademark Office*